US012803998B2

(12) United States Patent
Feng et al.

(10) Patent No.: US 12,803,998 B2
(45) Date of Patent: Nov. 17, 2026

(54) LARGE LANGUAGE MODEL (LLM) GUIDED ROBUST LEARNING SYSTEM DESIGN FOR C2 DETECTION

(71) Applicant: Palo Alto Networks, Inc., Santa Clara, CA (US)

(72) Inventors: Qian Feng, Mountain View, CA (US); Christian Elihu Navarrete Discua, San Jose, CA (US); Yu Fu, Sunnyvale, CA (US); Yanhui Jia, San Jose, CA (US); Yuwen Dai, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 117 days.

(21) Appl. No.: 18/374,892

(22) Filed: Sep. 29, 2023

(65) Prior Publication Data

US 2025/0080556 A1 Mar. 6, 2025

Related U.S. Application Data

(60) Provisional application No. 63/536,008, filed on Aug. 31, 2023.

(51) Int. Cl.

| | |
|---|---|
| ***H04L 9/40*** | (2022.01) |
| ***H04L 41/16*** | (2022.01) |
| *G06N 3/08* | (2023.01) |

(52) U.S. Cl.
CPC .......... *H04L 63/1425* (2013.01); *H04L 41/16* (2013.01); *H04L 63/1466* (2013.01); *H04L 63/20* (2013.01); *G06N 3/08* (2013.01); *H04L 63/1433* (2013.01)

(58) Field of Classification Search
CPC ............... G06F 21/577; H04L 63/1416; H04L 63/1425; H04L 16/1433
See application file for complete search history.

(56) References Cited

U.S. PATENT DOCUMENTS

2019/0098039 A1* 3/2019 Gates ..................... G16H 20/70
2022/0014554 A1* 1/2022 Vasu ....................... H04L 63/20
2023/0319086 A1* 10/2023 Beauchesne ............ H04L 63/20
726/1
2024/0143289 A1* 5/2024 Pandita ................... G10L 15/26
2024/0184892 A1* 6/2024 Ganz ..................... G06F 21/577
2024/0411994 A1* 12/2024 Siracusano ........... G06F 40/205
2025/0007942 A1* 1/2025 Crabtree ............. H04L 63/1433

* cited by examiner

*Primary Examiner* — Tom Y Chang
(74) *Attorney, Agent, or Firm* — Van Pelt, Yi & James LLP

(57) ABSTRACT

Various embodiments provide a system, method, and device for applying a C2 machine learning-based detection framework. The method incudes (i) generating a fuzzing based on a C2 machine-learning detection model using a large learning model for performing profile-based seed generation; and (ii) detecting C2 traffic using the C2 machine learning detection model.

24 Claims, 20 Drawing Sheets

300

360

| | | | | |
|---|---|---|---|---|
| HTTP | 243 | GET | /dqjogtrg/ | HTTP/1.1 |
| HTTP | 516 | POST | /dqjogtrg/ | HTTP/1.1 |
| HTTP | 260 | POST | /dqjogtrg/ | HTTP/1.1 |
| HTTP | 349 | GET | /CWoNaJLBo/VTNeww11212/JPHEIKCKDJNKNKIGMCHCHEBFMEADKEFPAFKJKOJHO/UT0qVQ132/ | HTTP/1.1 |
| HTTP | 148 | POST | /CWoNaJLBo/VTNeww11213/ | HTTP/1.1 |
| HTTP | 349 | GET | /CWoNaJLBo/VTNeww11212/JCAGLKAHMEIPIOMJFODPGPBLBONPEGIJBIMGPIG/UT0qVQ132/ | HTTP/1.1 |
| HTTP | 349 | GET | /CWoNaJLBo/VTNeww11212/AOFNNDBMFHPOGBOEEOMGMAHDNKJAPLPKDFLJKBOI/UT0qVQ132/ | HTTP/1.1 |
| HTTP | 349 | GET | /CWoNaJLBo/VTNeww11212/JPOECCBKLHKHILDHOAACHHCNNDFNEKOIGKDAHPOC/UT0qVQ132/ | HTTP/1.1 |
| HTTP | 349 | GET | /CWoNaJLBo/VTNeww11212/NMBFCFCKKMMPAMOMGPEIAIMGCFKLOGGMOALBBJDD/UT0qVQ132/ | HTTP/1.1 |
| HTTP | 349 | GET | /CWoNaJLBo/VTNeww11212/OGCLDMCBHKFLGOCOLMJMJJHAEJKCKKFNGHFBKGM/UT0qVQ132/ | HTTP/1.1 |
| HTTP | 349 | GET | /CWoNaJLBo/VTNeww11212/CDEJEOBNMLPMNEAFFEGMACELABBNLKOEBCGCMMFEC/UT0qVQ132/ | HTTP/1.1 |
| HTTP | 349 | GET | /CWoNaJLBo/VTNeww11212/KONNFEHMBGCPLCCCKOCALPIEFPNBFKNELAOJJCHA/UT0qVQ132/ | HTTP/1.1 |
| HTTP | 349 | GET | /CWoNaJLBo/VTNeww11212/EEAIINENDJECHEHCNKCICPMKDEFDGOLCKPKFGBO/UT0qVQ132/ | HTTP/1.1 |
| HTTP | 349 | GET | /CWoNaJLBo/VTNeww11212/AGLKPLGGAKMKBOJFEDBINMLNBPILMFDOHNFHGLGB/UT0qVQ132/ | HTTP/1.1 |
| HTTP | 349 | GET | /CWoNaJLBo/VTNeww11212/AFDHFEGGLKGEMCCIGLJDKHCLMNAIGBCLOOLACMJE/UT0qVQ132/ | HTTP/1.1 |

350

FIG. 3B

<The format definition for each field in the format>:

Python

This partial profile defines for an HTTP GET transaction. The first statement, set uri, assigns the URI that the client and server will reference during this transaction. This set statement occurs outside of the client and server code blocks because it applies to both of them.

The client block defines indicators for the client that performs an HTTP GET. The client, in this case, is Cobalt Strike's Beacon payload.

When Cobalt Strike's Beacon "phones home" it sends metadata about itself to Cobalt Strike. In this profile we have to define how this metadata is endcoded and send with our HTTP GET request.

The metadata keyword followed by a group of statements specifies how to transform and embed metadata in our HTTP GET request. The group of statements, following the metadata keyword, is called a data transform.

575

FIG. 5C

```
Python:
#
$Comfoo profile
#
Http://www.secureworks.com-cbyer-thread-intelligence/threats/secrets-of-the-comfoo-masters/
#
# Author: @harmj0y
#

set sleeptime “3000”; use a ~30s delay between callbacks
set jitter “20”;
set maxdns “255”;
set useragent “Mozilla/4.0 (compatible; MSIE 6.0; Windows NT 5.1)”

http-get {
        set uri “/CWoNaJLBo/VTNeWw11212/”;

        client {
                header “Accept” “image/gif, image/x-xbitmap, image/jpeg, image/pjeg, */*”;
                header “Accept-Language” “en-en”;
                header “Connection” “Keel-Alive”;
                header “Cache-Control” “no-cache”;

        metadata {
                netbiosu;
                append “ /UTW0qVQ132/”;
                uri-append;
                }
        }
```

605

600

FIG. 6A

610

```
        server {
                header "Server" "Apache/2.0.50 (Unix)";
                header "Keep-Alive" "timeout=15, max=90";

                output {
                        print;
                }
        }
}
```

655

```
http-post {
                set uri "/CWoNaJLBo/VTNeWw11213/";

        client {
                header "Accept" "image/gif, image/x-xbitmap, image/jpeg, image/pjpeg, */*";
                header "Accept-Language" "en-en";
                header "Connection "Keel-Alive";
                header "Cache-Control" "no-cache";

        id {
                netbiosu;
                append "/UTW0qVQ132/";
                uri-append;
        }
        output {
                print;
        }
}

server {
                header "Server" "Apache/2.0.50 (Unix)";
                header "Keep-Alive" "timeout=15, max=90";

                output {
                        base64;
                        print;
                }
        }
}
```

650

FIG. 6B

```
Python

# this is a comment
set global_option "value";
protocol-transaction {
        set local_option "value";
        client {
                # customize client indicators
        }
        server {
                #customize server indicators}}
```

700

FIG. 7A

```
C/C++

set sleeptime "30000"; # use a ~30s delay between callbacks
set jitter "20";
set maxdns "255";
set useragent "Mozilla/4.0 (compatible; MSIE 6.0;Windows NT 5.1)";
http-get {
        set uri "/CWoNaJLBo/VTNeWw11212/";
        client {
                header "Accept" "image/gif, image/x-xbitmap, image/jpeg, image/pjpeg, */*";
                header "Accept-Language" "en-en";
                header "Connection" "Keel-Alive";
                header "Cache-Control" "no-cache";
                metadata {
                        netbiosu;
                        append "/UTWOqVQ132/";
                        uri-append;
                }
        }
        server {
                header "Server" "Apache/2.0.50 (Unix)";
                header "Keep-Alive" "timeout=15, max=90";
                output {
                        print;
                }
        }}
```

750

FIG. 7B

LARGE LANGUAGE MODEL (LLM) GUIDED ROBUST LEARNING SYSTEM DESIGN FOR C2 DETECTION

CROSS REFERENCE TO OTHER APPLICATIONS

This application claims priority to U.S. Provisional Patent Application No. 63/536,008 entitled LARGE LANGUAGE MODEL (LLM) GUIDED ROBUST LEARNING SYSTEM DESIGN FOR C2 DETECTION filed Aug. 31, 2023 which is incorporated herein by reference for all purposes.

BACKGROUND OF THE INVENTION

In today's digital landscape, the prevalence of cyber threats poses a significant challenge to organizations, governments, and individuals alike. Cybercriminals constantly evolve their tactics, making it imperative for security professionals to stay ahead by developing innovative solutions to detect and counteract malicious activities.

One common method employed by attackers is the establishment of a Command and Control (C2) infrastructure. C2 traffic enables hackers to maintain control over compromised devices, allowing them to issue commands, extract data, or launch further attacks. Traditional security measures often struggle to identify C2 traffic due to its covert nature, complex encryption, or obfuscation techniques employed by attackers.

Existing approaches to C2 traffic detection predominantly rely on signature-based or rule-based systems, which can be limited in their effectiveness. Signature-based detection relies on pre-defined patterns or known indicators of compromise (IOCs), making it susceptible to false negatives if attackers modify their techniques. Rule-based systems operate similarly, employing predefined rules to identify specific types of C2 traffic. However, rule-based approaches may struggle to keep up with the rapidly evolving threat landscape, resulting in false positives or missed detections.

Therefore, a need exists for an innovative system and method that can accurately and efficiently detect malicious C2 traffic, regardless of its obfuscation techniques or modifications made by attackers.

BRIEF DESCRIPTION OF THE DRAWINGS

Various embodiments of the invention are disclosed in the following detailed description and the accompanying drawings.

FIG. 3B is an example of HTTP traffic generated according to various embodiments.

FIG. 5C is an example of a format definition for a query provided to a large language model (LLM) to obtain a sample profile seed according to various embodiments.

FIG. 6A is an example of a first part of an output from a large language model (LLM) in response to a request for a sample profile seed according to various embodiments.

FIG. 6B is an example of a first part of an output from a large language model (LLM) in response to a request for a sample profile seed according to various embodiments.

FIG. 7A is an example of a format of malleable C2 profile according to various embodiments.

FIG. 7B is an example of a partial malleable C2 profile according to various embodiments.

DETAILED DESCRIPTION

Figure 1:
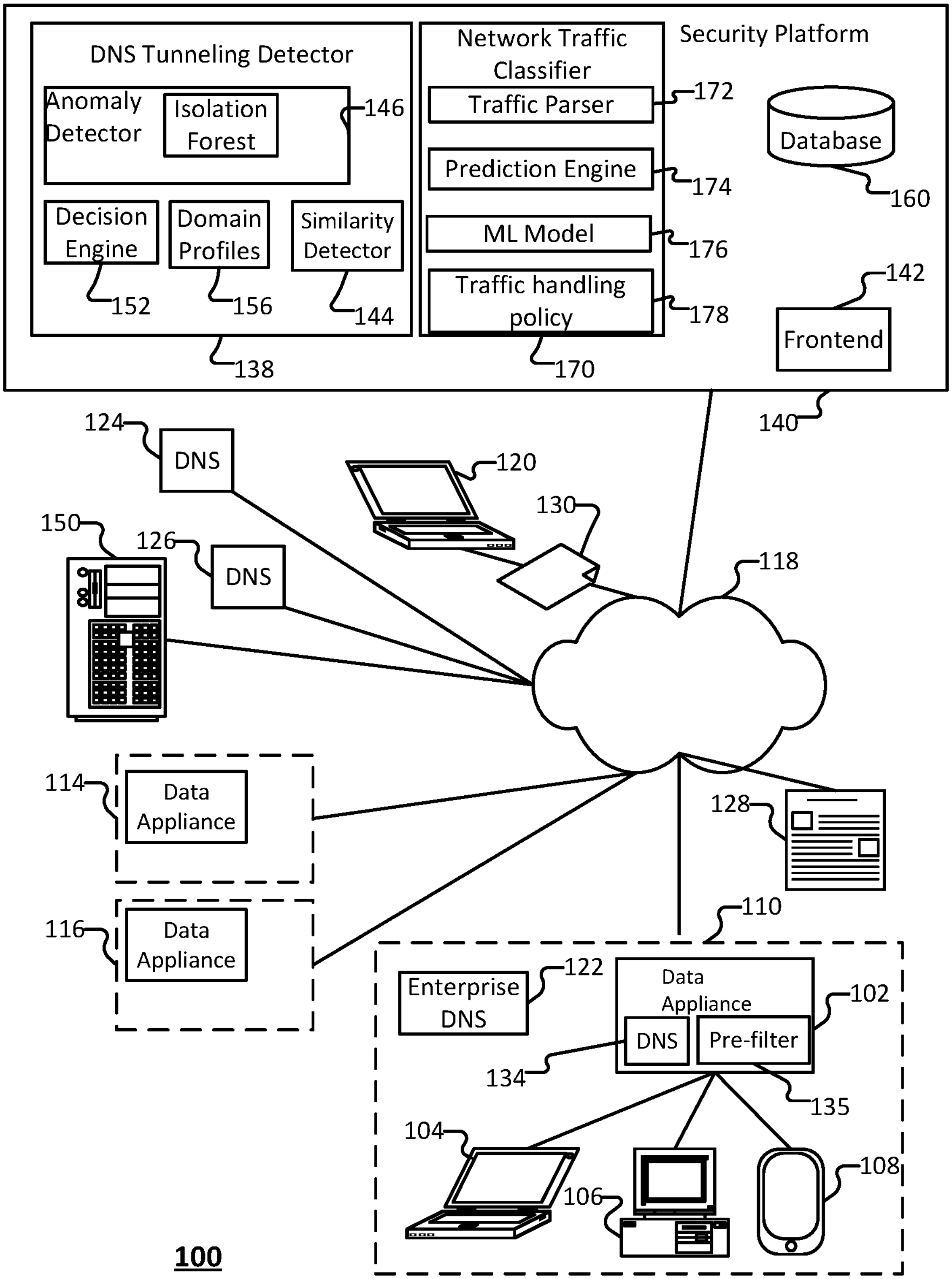
FIG. 1 is a block diagram of an environment for detecting malicious traffic according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a fuzzer is a program that automatically generates semi-random data for use in a program/stack to detect bugs or malicious exploits. For example, a fuzzer is a program which injects automatically semi-random data into a program/stack and detect bugs. A fuzzer may try combination of attacks on numbers (e.g., signed/unsigned integers/float, etc.), chars (e.g., URLs, command-line inputs, etc.), metadata: user-input text (e.g., id3 tag, etc.), and/or pure binary sequences.

In some embodiments, a fuzzer creates listeners, stagers and/or agents accordingly based on profile seeds. The system implements a C2 traffic generator that monitors the network between agents and stagers, and records their traffic into packet capture (PCAP) records for use in training a classifier (e.g., a machine learning model).

As used herein, a fuzzing may include an output from a fuzzer. An example of a fuzzing is network traffic samples, such as sample C2 traffic, generated by a fuzzer based at least in part on a particular profile (e.g., a profile seed(s), etc.).

Empire C2 is a widely used command and control (C2) framework known for its ability to execute various payloads in computer memory and establish hidden, long-lasting connections to a victim machine. The support for malleable C2 profiles further enhances configurability and makes detection more difficult. By altering the HTTP indicators associated with the C2 profile, Empire C2 can easily evade signature-based detections.

As various open-source C2 frameworks like Powershell Empire C2 emerge, detecting C2 traffic becomes increasingly challenging. Machine learning offers a potential solution to identify these variations. However, gathering training data for C2 detectors is a formidable task due to the difficulty in obtaining a substantial amount of high-quality C2 traffic from real-world sources.

Various embodiments provide a system, method, and device for applying a C2 machine learning-based detection framework. The method incudes (i) generating a fuzzing based on a C2 machine learning detection model using a large learning model for performing profile-based seed generation; and (ii) detecting C2 traffic using the C2 machine learning detection model.

Various embodiments provide a system, method, and device for applying a C2 machine learning-based detection framework. The method incudes (i) querying an LLM for a set of one or more profile seeds, (ii) generating a fuzzing based at least in part on the set of one or more profile seeds, (iii) training a C2 traffic detection model based at least in part on the fuzzing, and (iv) deploying the C2 traffic detection model to a security entity or service. The C2 traffic detection model may be trained based on a machine learning technique. In some embodiments, the set of one or more profile seeds trigger different lines of code (e.g., because the profile seed(s) can generate different C2 traffic behaviors).

In some embodiments, the collects C2 traffic (e.g., Empire C2 traffic) using LLM-enhanced fuzzing. The system employs generative AI to create an intelligent fuzzer for the Empire C2 framework. This enables automated data preparation and streamlines creation of Empire C2 traffic. The LLM-enhanced fuzzing generates a wide variety (e.g., a broad code coverage) of useful C2 traffic that is used to a train a classifier, which in turn can predict C2 classifications across a broad range of potential C2 traffic (e.g., across broad variations in code).

FIG. 1 is a block diagram of an environment for detecting malicious traffic according to various embodiments. In various embodiments, system 100 is implemented in connection with system 200 FIG. 2 and/or system 300 of FIG. 3. In various embodiments, system 100 is implemented in connection with process 800 of FIG. 8, process 900 of FIG. 9, process 1000 of FIG. 10, process 1100 of FIG. 11, process 1200 of FIG. 12, process 1300 of FIG. 13, process 1400 of FIG. 14, and/or process 1500 of FIG. 15.

In the example shown, client devices 104-108 are a laptop computer, a desktop computer, and a tablet (respectively) present in an enterprise network 110 (belonging to the "Acme Company"). Data appliance 102 is configured to enforce policies (e.g., a security policy, a network traffic handling policy, etc.) regarding communications between client devices, such as client devices 104 and 106, and nodes outside of enterprise network 110 (e.g., reachable via external network 118). Examples of such policies include policies governing traffic shaping, quality of service, and routing of traffic. Other examples of policies include security policies such as ones requiring the scanning for threats in incoming (and/or outgoing) email attachments, website content, inputs to application portals (e.g., web interfaces), files exchanged through instant messaging programs, and/or other file transfers. Other examples of policies include security policies (or other traffic monitoring policies) that selectively block traffic, such as traffic to malicious domains or parked domains, or such as traffic for certain applications (e.g., SaaS applications). In some embodiments, data appliance 102 is also configured to enforce policies with respect to traffic that stays within (or from coming into) enterprise network 110.

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, Microsoft Windows PE installers, etc.). In the example environment shown in FIG. 1, client devices 104-108 are a laptop computer, a desktop computer, and a tablet (respectively) present in an enterprise network 110. Client device 120 is a laptop computer present outside of enterprise network 110.

Data appliance 102 can be configured to work in cooperation with remote security platform 140. Security platform 140 can provide a variety of services, including classifying network traffic (e.g., identifying application(s) to which particular samples of network traffic corresponding, determining whether traffic is malicious, detecting malicious traffic, detecting C2 traffic, etc.), providing a mapping of signatures to certain traffic (e.g., a type of C2 traffic,) or a mapping of signatures to applications/application identifiers (e.g., network traffic signatures to application identifiers), providing a mapping of IP addresses to certain traffic (e.g., traffic to/from a client device for which C2 traffic has been detected, or for which security platform 140 identifies as being benign), performing static and dynamic analysis on malware samples, assessing maliciousness of domains, determining whether domains are parked domains, providing a list of signatures of known exploits (e.g., malicious input strings, malicious files, malicious domains, etc.) to data appliances, such as data appliance 102 as part of a subscription, detecting exploits such as malicious input strings, malicious files, or malicious domains (e.g., an on-demand detection, or periodical-based updates to a mapping of domains to indications of whether the domains are malicious or benign), providing a likelihood that a domain is malicious (e.g., a parked domain) or benign (e.g., an unparked domain), providing/updating a whitelist of input strings, files, or domains deemed to be benign, providing/updating input strings, files, or domains deemed to be malicious, identifying malicious input strings, detecting malicious input strings, detecting malicious files, predicting whether input strings, files, or domains are malicious, and providing an indication that an input string, file, or domain is malicious (or benign).

In various embodiments, results of analysis (and additional information pertaining to applications, domains, etc.), such as an analysis or classification performed by security platform 140, are stored in database 160. In various embodiments, security platform 140 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 140 can be implemented across a scalable infrastructure comprising multiple such servers, solid state drives, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As one example, security platform 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 140 but may also be provided by a third party. As one example, the virtual machine server can rely on EC2, with the remainder portions of security platform 140 provided by dedicated hardware owned by and under the control of the operator of security platform 140.

In some embodiments, network traffic classifier 170 detects/classifies network traffic. For example, the network traffic classifier determines the application (e.g., an application identifier) to which a sample of network traffic corresponds. In some embodiments, network traffic classifier 170 classifies the sample based at least in part on a signature of the sample, such as by querying a mapping of signatures to applications/application identifiers (e.g., a set of previously analyzed/classified applications). In some embodiments, network traffic classifier 170 classifies the sample based on a predicted traffic classification (e.g., a prediction of whether traffic is C2 traffic, or whether sampled traffic is malicious traffic, etc.). For example, network traffic classifier 170 determines (e.g., predicts) the traffic classification based at least in part on header information for the traffic. Network traffic classifier 170 may automatically detect a plurality of types of C2 frameworks in connection with determining whether the traffic is malicious. For example, network traffic classifier 170 includes a classifier or model (e.g., ML model 176) that is trained to detect C2 traffic. The classifier may be configured to detect C2 traffic for a plurality of C2 frameworks. Additionally, or alternatively, the classifier may be configured to detect a particular C2 framework, and system 100 (e.g., network traffic classifier 170) may store a plurality of classifiers that each correspond to different C2 frameworks.

In response to determining a predicted classification for a sample (e.g., a traffic sample), network traffic classifier 170 may determine a signature for the sample and store in a mapping of signatures to traffic classifications (e.g., an indication of whether the sample is malicious or benign/non-malicious) the sample signature in association with the predicted classification. In some embodiments, in response to determining a predicted classification for a sample (e.g., a traffic sample), network traffic classifier 170 may store an association between the IP address for network traffic and an indication of whether the traffic is malicious or benign/non-malicious. For example, network traffic classifier 170 identifies an IP address to/from which C2 traffic is being communicated (e.g., an IP address for the client device corresponding to a beacon in the C2 framework).

In some embodiments, system 100 (e.g., network traffic classifier 170, security platform 140, etc.) trains a classifier (e.g., a model) to detect (e.g., predict) traffic for applications. For example, system 100 trains a classifier to perform traffic classification (e.g., to classify traffic as malicious or benign/non-malicious). As another example, system 100 trains a classifier to determine whether a traffic sample corresponds to C2 traffic. The classifier is trained based at least in part on a machine learning process. Examples of machine learning processes that can be implemented in connection with training the classifier(s) include random forest, linear regression, support vector machine, naive Bayes, logistic regression, K-nearest neighbors (KNN), decision trees, gradient boosted decision trees, K-means clustering, hierarchical clustering, density-based spatial clustering of applications with noise (DBSCAN) clustering, principal component analysis, a convolutional neural network (CNN), etc. In some embodiments, network traffic classifier 170 implements a CNN model.

In some embodiments, system 100 (e.g., network traffic classifier 170, security platform 140, etc.) trains/updates the classifier based at least in part on a fuzzing generated by system. For example, system 100 generates a set of network traffic samples (e.g., a set of malicious samples and/or a set of benign samples, etc.) to train the classifier. The set of network traffic samples are generated based at least in part on a profile configuration, such as a profile seed that is probabilistically determined. System 100 may obtain a profile suggestion, such as a profile for a known benign or known malicious sample, and query a large language model (LLM) for one or more profiles similar to the profile suggestion. Examples of the LLM include ChatGPT, Bard, RoBERTa, BLOOM, vertex AI, or LLaMA, etc. Various other LLMs may be implemented. The LLM analyzes the profile suggestion and generates one or more profile seeds. In response to obtaining the one or more profile seeds, system 100 generates network traffic samples for the profile seed(s). For example, system 100 invokes a C2 fuzzer to generate C2 traffic samples using the profile seed(s).

The use of LLM-enhanced fuzzing to generate network traffic samples used in training a classifier enables system to provide a robust and effective classifier to detect C2 traffic. In contrast, related art systems may use deterministic techniques for generating samples that always the same network traffic samples for the same HTTP indicators, thereby having a limited variance between samples and a narrow scope of code coverage. Additionally, or alternatively, some related art systems provide samples that have low fidelity because of the random mutation of profile seeds as inputs to a fuzzer. The use of a random mutation of profile seeds results in a significant number of useless seeds.

System 100 (e.g., network traffic classifier 170, security platform 140, etc.) performs feature extraction with respect to the sample traffic, such as performing embedding extraction on header information for the sample traffic. In some embodiments, system 100 (e.g., network traffic classifier 170) generates a set of embeddings for training a machine learning model for classifying the traffic (e.g., classifying whether the traffic is malicious/non-malicious). System 100 then uses the set of embeddings to train a machine learning model (e.g., a CNN model) such as based on training data that includes benign samples of network traffic and malicious samples of network traffic.

According to various embodiments, security platform 140 comprises DNS tunneling detector 138 and/or network traffic classifier 170. Security platform 140 may include various other services/modules, such as a malicious sample detector, a parked domain detector, an application classifier or other traffic classifier, etc. Network traffic classifier 170 is used in connection with analyzing samples of network traffic and/or automatically detecting C2 traffic. For example, network traffic classifier 170 analyzes a sample (e.g., a packet(s) of network traffic, such as a packet comprising header information) and predicts whether the network traffic is malicious or otherwise corresponds to C2 traffic. In response to receiving an indication that an assessment of a sample of network traffic (e.g., C2 type classification, determine whether the malicious/benign, etc.) is to be performed, network traffic classifier 170 analyzes the sample to determine the assessment of the network traffic (e.g., C2 traffic classification, determine whether the sample is malicious or benign/non-malicious, etc.). For example, network traffic classifier 170 extracts header information from the sample, processes the header information (e.g., convert the header information to a predefined format), determines an embedding(s) or other feature vector for the header, and uses a machine learning model (e.g., a CNN model) to determine a machine learning-based predicted classification.

In some embodiments, in connection with determining the machine learning-based prediction classification, network traffic classifier 170 (i) receives an indication of a sample, (ii) obtains information pertaining the sample (e.g., header information, etc.), (iii) determines a feature vector for the sample based on the information pertaining to the sample (e.g., determines a header embedding(s)), (iv) queries a model (e.g., a machine learning model), and (v) determines a C2 type, a traffic classification, or otherwise whether the traffic is malicious/benign based on the querying the model (e.g., network traffic classifier 170 obtains a predicted classification). In some embodiments, the determining the feature vector for the sample (e.g., determining the header embeddings) includes (a) parsing of the information pertaining to the sample, (b) obtaining header information for the sample, (c) process the header information to convert the header to a predefined format, and (d) generating the feature vector or header embeddings based at least in part on the header information in the predefined format.

In some embodiments, network traffic classifier 170 classifies the traffic based on HTTP request data. For example, network traffic classifier 170 obtains a sample of HTTP request data being communicated across a network and uses the HTTP request sample in connection with detecting C2 traffic or otherwise determining whether the associated traffic is malicious/non-malicious.

In some embodiments, network traffic classifier 170 comprises one or more of traffic parser 172, prediction engine 174, ML model 176, and/or traffic handling policy 178.

Traffic parser 172 is used in connection with determining a header for network traffic (e.g., the traffic sample being analyzed). Traffic parser 172 extracts header information from the sample. In response to extracting the header information, traffic parser 172 formats the header information according to a predefined format (e.g., a predefined header format). For example, traffic parser 172 orders fields or information comprised in the header information into a predefined order. As another example, traffic parser 172 formats cookie headers within the header information according to a predefined cookie header format. In some embodiments, formatting the header information according to the predefined format normalizes the information to be analyzed according to a machine learning model (e.g., a CNN model) to provide a generic detection across a plurality of types of C2 frameworks. Related art system required a plurality of models, each of which is trained to detect a particular C2 framework (e.g., only Cobalt Strike, or only Empire, etc.) and thus ineffective to detect traffic for other types of C2 frameworks. For example, a related art system deploying a model to detect Cobalt Strike traffic is ineffective in detecting Empire traffic.

Formatting cookie headers comprised in the header for a sample according to a predefined cookie header format includes determining an encoding used to encode the header. Examples of encodings include base64, base64url, netbios, and netbiosu. Various other encodings may be implemented. In some embodiments, traffic parser 172 determines the particular encoding for a cookie in the headers. As an example, the encoding is determined based on a syntax for the cookie comprised in the header. As another example, a predefined set of rules or heuristics are used to detect a type of encoding used to encode the cookie. Examples of heuristics include (i) the presence of a special character in the cookie, (ii) the presence of the % character in the cookie, (iii) the presence of uppercase characters, and/or (iv) all alphabetic characters in the cookie are lower case. Various other types of rules or heuristics may be implemented. For example, a system may be trained to detect other patterns in the header or the cookie header in particular (e.g., attackers often put the session secrets in the http cookie header).

In some embodiments, formatting the cookie header according to a predefined cookie header format includes determining a representation for the cookie indicating the type of encoding and the length of the cookie. For example, traffic parser concatenates the type of encoding and length. As another example, traffic parser determines a tuple of the type of encoding and length. Each encoding type may have a particular length or range of lengths. Examples of lengths for particular encodings include: (i) base64 length (value)==28, (ii) base64url length(value) is within the range of [28,40], (iii) netbios length(value)==40, (iv) netbiosu length(value)==40. Traffic parser 172 may determine a cookie to be encoded according to the netbios encoding if the cookie comprises only lowercase letters and has a length(value)==40. Traffic parser 172 may determine a cookie to be encoded according to the netbiosu encoding if the cookie has uppercase letters (or only uppercase letter) and has a length(value)==40. An example of the representation for a cookie encoded using the base64url encoding and having a length 30 is (base64url,30).

In response to determining the representation for the cookie (e.g., the tuple of the encoding type and length), traffic parser 172 inserts the representation for the cookie into the cookie header in connection with formatting the header information according to a predefined format.

Although the foregoing example indicates that the cookie header is formatted according to a predefined cookie header format, various other types of headers within the header information may be formatted according to corresponding to predefined header formats. Examples of the types of headers within the header that are formatted include a cookier header, a URI header, a referer header, and an authentication header. Traffic parser 172 may format (i) the URI header according to a predefined URI header format, (ii) the referer header according to a predefined referer header format, (iii) the authentication header according to a predefined authentication format. The various types of headers within the header information may be converted to a tuple including the encoding type and the length, such as (encoder, length).

In some embodiments, traffic parser 172 determines the header type comprising the secret. For example, traffic parser 172 may determine the header type comprising the secret based at least in part on a set of rules or heuristics, such as determining the header type comprising information formatted according to a particular tuple (e.g., a header type comprising information encoded in a certain manner and having a certain length).

In some embodiments, formatting the header information according to a predefined format includes determining the header type in which the secret is comprised (e.g., based on a set of rules or heuristics), converting the secret in the determined the particular header corresponding to the header type to a predefined format (e.g., a tuple including an encoding type and length), and inserting the converted secret (in the predefined format) into the cookie header. As an example, if the secret is stored in the URI header, traffic parser 172 converts the information in the URI header to the tuple format (e.g., (encoder, length)) and inserts the tuple into the cookie header. As another example, if the secret is stored in the referer header, traffic parser 172 converts the information in the referer header to the tuple format (e.g., (encoder, length)) and inserts the tuple into the cookie header. As another example, if the secret is stored in the authentication header, traffic parser 172 converts the information in the authentication header to the tuple format (e.g., (encoder, length)) and inserts the tuple into the cookie header (or other predefined header).

Although the foregoing example describes the reformatting of the headers and inserting the representation of the secret (e.g., the tuple for encoding and length) into the cookie header, the representation of the secret may be inserted into a different header. For example, various embodiments select a unified header into which the representation of the secret is to be inserted, and for each sample, the reformatting the header information includes determining the representation of the secret and inserting the representation into the selected unified header.

Network traffic classifier 170 determines embeddings associated with the sample being analyzed. For example, traffic parser 172 determines header embeddings for the header information comprised in the sample. The header embeddings may be determined after the header information has been formatted according to the predefined header format.

Prediction engine 174 is used in connection with predicting a classification for the sample, detecting C2 traffic, or otherwise predicting whether the corresponding traffic is malicious/non-malicious. For example, prediction engine 174 predicts whether the network traffic associated with the sample is C2 traffic or malicious traffic. Prediction engine 174 may detect C2 traffic or malicious traffic (e.g., predict whether the traffic is malicious/non-malicious) based at least in part on the embeddings for the sample (e.g., the header embeddings obtained by traffic parser 172). In some embodiments, prediction engine 174 uses a machine learning process to analyze the sample/detect whether the traffic is C2 traffic or otherwise malicious traffic. As an example, the machine learning process includes use of a CNN. Using the machine learning process to analyze the sample and/or detect C2 traffic or otherwise malicious traffic may include querying a classifier (e.g., a model), such as ML model 176. For example, prediction engine 174 queries the classifier based at least in part on the embeddings determined for the sample.

In some embodiments, the classifier (e.g., ML model 176) is trained using a machine learning process. For example, the classifier is a CNN model. The CNN model may be trained from a training set comprising a subset of benign samples and a subset of malicious samples. The samples in the training set may be formatted in accordance with the predefined format. For example, the samples in the training set are HTTP request samples, and the headers for the sample HTTP requests are formatted according to the predefined header format. The header embeddings are an efficient and dense representation in which similar words or strings have a similar encoding.

In some embodiments, the embeddings (e.g., the header embeddings for the classifier) are not defined manually by a subject matter expert. For example, the encoding for the embeddings is not manually defined by a subject matter expert in the same manner that related art feature vectors are developed. Rather, the embeddings are trainable parameters that may be trained automatically. In some embodiments, the embeddings technique for determining the embeddings corresponds to a technique used to determine embeddings for a particular model to be used to train the classifier. For example, the system may use the advanced embedding technique for Bert models. As another example, the system may use the embedding technique for GPT2 models. In some embodiments, the embedding technique used to determine the header embeddings encodes the context for a particular word or string, such as by including information pertaining to preceding and succeeding words in the vector that represents the given instance of the particular word or string.

In some embodiments, system 100 (e.g., network traffic classifier 170) determines the header embeddings based on a customized training of a machine learning model, a pre-trained existing model (e.g., a Bert model, a GPT2 model, a GTP4 model, etc.), or a re-trained existing model using a bespoke dataset (e.g., a dataset comprising benign traffic samples and C2 traffic samples). As an example, Bert is a method of pre-training language representations. However, the pre-trained existing models are trained on a generic dataset, and thus are not optimized for traffic classification (e.g., detecting C2 traffic or otherwise malicious traffic), and therefor may provide ineffective classifications. In embodiments, system 100 obtains the existing models and retrains the existing models on a bespoke or custom dataset (e.g., a dataset comprising benign traffic samples and C2 traffic samples, such as collected HTTP request datasets). The bespoke or custom dataset may comprise only sample HTTP requests. The retraining of the existing models fine tunes such models on more relevant samples (e.g., the collected HTTP request samples).

In connection with predicting a classification for a sample, prediction engine 174 applies a machine learning model to determine whether a particular sample is C2 traffic, whether the particular sample is malicious, or whether the particular sample is benign/non-malicious. Applying the machine learning model to detect C2 traffic includes querying the machine learning model, such as querying the model with information pertaining to the header information comprised in an HTTP request (e.g., a header embedding determined after formatting the header information according to a predefined format). As an example, the model is queried using a header embedding that is generated based on an encoding of header information for the sample. In some implementations, the machine learning model is pre-trained and prediction engine 174 does not need to provide a set of training data (e.g., sample HTTP requests data for benign traffic or malicious/C2 traffic, etc.) to the machine learning model. Prediction engine 174 receives a result (e.g., verdict) of a determination or analysis by the machine learning model. In some embodiments, prediction engine 174 receives, from the machine learning model (e.g., ML model 176), an indication of a likelihood that the sample corresponds to C2 traffic, a likelihood that the sample is malicious, or a likelihood that the sample is benign/non-malicious. In response to receiving the indication of the likelihood that the sample corresponds to C2 traffic, a likelihood that the sample is malicious, or a likelihood that the sample is benign/non-malicious, prediction engine 174 determines (e.g., predicts) a traffic classification based on such likelihood. For example, prediction engine 174 compares the likelihood that the sample corresponds to C2 traffic to a likelihood threshold value. In response to a determination that the likelihood that the sample corresponds to C2 traffic is greater than the likelihood threshold value, prediction engine 174 may deem (e.g., determine that) the sample as corresponding to C2 traffic.

According to various embodiments, in response to prediction engine 174 classifying the sample, system 100 handles the sample or traffic matching the sample (e.g., a traffic having a signature the same as the sample, traffic originating from the same IP address as the sample, etc.) according to a predefined policy. For example, the system queries traffic handling policy 178 to determine the manner by which traffic matching the sample is to be handled. Traffic handling policy 178 may be a predefined policy, such as a security policy, etc. Traffic handling policy 178 may indicate that traffic for certain applications is to be blocked and traffic for other applications is to be permitted to pass through the system (e.g., routed normally). Traffic handling policy 178 may correspond to a repository of a set of policies to be enforced with respect to network traffic. In some embodiments, security platform 140 receives one or more policies, such as from an administrator or third-party service, and provides the one or more policies to various network nodes, such as endpoints, security entities (e.g., inline firewalls), etc.

In response to determining a classification for a newly analyzed sample, security platform 140 (e.g., network traffic classifier 170) sends an indication that traffic matching the sample is associated with, or otherwise corresponds to, the determined classification. In the case that the determined classification is C2 traffic, security platform 140 provides an indication that traffic matching the sample (e.g., the same sample signature or same originating IP address, etc.) is also deemed C2 traffic. For example, security platform 140 computes a signature for the sample (e.g., a hash or other signature), and sends to a network node (e.g., a security entity, an endpoint such as a client device, etc.) an indication of the classification associated with the signature (e.g., an indication whether the traffic is C2 traffic, or an indication whether the traffic is malicious/non-malicious traffic). Security platform 140 may update a mapping of signatures to traffic classifications and provide the updated mapping to the security entity. In some embodiments, security platform 140 further provides to the network node (e.g., security entity, client device, etc.) an indication of a manner in which traffic matching the signature is to be handled. For example, security platform 140 provides to the security entity a traffic handling policy, a security policy, or an update to a policy.

In response to receiving a sample to be analyzed, security platform 140 (e.g., network traffic classifier 170) determines the traffic classification, such as based on querying a classifier based on a header embedding for the header information of the sample. As an example, network traffic classifier 170 determines whether an identifier or representative information corresponding to the sample (e.g., a signature of the sample, an originating IP address) is comprised in the historical information (e.g., a blacklist, a whitelist, etc.). In some embodiments, representative information corresponding to the sample is a hash or signature of the access path (or subset of the access path) for the sample. In some embodiments, representative information corresponding to the sample is a hash or signature of the header information (or header information re-formatted according to the predefined header format) for the sample.

In some embodiments, system 100 (e.g., prediction engine 174 of network traffic classifier, an inline firewall or other inline security entity, etc.) determines whether information pertaining to a particular sample (e.g., a newly received sample to be analyzed) is comprised in a dataset of historical samples (e.g., historical network traffic), whether a particular signature is associated with malicious traffic, or whether traffic corresponding to the sample to be otherwise handled in a manner different than the normal traffic handling. The historical information may be provided by a third-party service such as VirusTotal™. In response to determining that information pertaining to a sample is not comprised in, or available in, the dataset of historical samples, system 100 (e.g., network traffic classifier 170 or other inline security entity) may deem that the sample/traffic has not yet been analyzed and system 100 can invoke an analysis (e.g., a sample analysis) of the sample in connection with determining (e.g., predicting) the traffic classification (e.g., an inline security entity can query a classifier, such as network traffic classifier 170 that uses the header information for the sample to query a machine learning model). The historical information (e.g., from a third-party service, a community-based score, etc.) indicates whether other vendors or cyber security organizations deem the particular traffic as malicious or should be handled in a certain manner.

Returning to FIG. 1, suppose that a malicious individual (using client device 120) has created malware or malicious sample 130, such as a file, an input string, etc. The malicious individual hopes that a client device, such as client device 104, will execute a copy of malware or other exploit (e.g., malware or malicious sample 130), compromising the client device, and causing the client device to become a bot in a botnet. The compromised client device can then be instructed to perform tasks (e.g., cryptocurrency mining, or participating in denial-of-service attacks) and/or to report information to an external entity (e.g., associated with such tasks, exfiltrate sensitive corporate data, etc.), such as C2 server 150, as well as to receive instructions from C2 server 150, as applicable.

The environment shown in FIG. 1 includes three Domain Name System (DNS) servers (122-126). As shown, DNS server 122 is under the control of ACME (for use by computing assets located within enterprise network 110), while DNS server 124 is publicly accessible (and can also be used by computing assets located within network 110 as well as other devices, such as those located within other networks (e.g., networks 114 and 116)). DNS server 126 is publicly accessible but under the control of the malicious operator of C2 server 150. Enterprise DNS server 122 is configured to resolve enterprise domain names into IP addresses, and is further configured to communicate with one or more external DNS servers (e.g., DNS servers 124 and 126) to resolve domain names as applicable.

As mentioned above, in order to connect to a legitimate domain (e.g., www.example.com depicted as website 128), a client device, such as client device 104 will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C2 server 150, client device 104 will need to resolve the domain, "kj32hkjqfeuo32-ylhkjshdflu23. badsite.com," to a corresponding Internet Protocol (IP) address. In this example, malicious DNS server 126 is authoritative for *.badsite.com and client device 104's request will be forwarded (for example) to DNS server 126 to resolve, ultimately allowing C2 server 150 to receive data from client device 104.

Data appliance 102 is configured to enforce policies regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, information input to a web interface such as a login screen, files exchanged through instant messaging programs, and/or other file transfers, and/or quarantining or deleting files or other exploits identified as being malicious (or likely malicious). In some embodiments, data appliance 102 is also configured to enforce policies with respect to traffic that stays within enterprise network 110. In some embodiments, a security policy includes an indication that network traffic (e.g., all network traffic, a particular type of network traffic, etc.) is to be classified/scanned by a classifier that implements a pre-filter model, such as in connection with detecting malicious or suspicious samples, detecting parked domains, or otherwise determining that certain detected network traffic is to be further analyzed (e.g., using a finer detection model).

In various embodiments, when a client device (e.g., client device 104) attempts to resolve an SQL statement or SQL command, or other command injection string, data appliance 102 uses the corresponding sample (e.g., an input string) as a query to security platform 140. This query can be performed concurrently with the resolution of the SQL statement, SQL command, or other command injection string. As one example, data appliance 102 can send a query (e.g., in the JSON format) to a frontend 142 of security platform 140 via a REST API. Using processing described in more detail below, security platform 140 will determine whether the queried SQL statement, SQL command, or other command injection string indicates an exploit attempt and provide a result back to data appliance 102 (e.g., "malicious exploit" or "benign traffic").

In various embodiments, when a client device (e.g., client device 104) attempts to open a file or input string that was received, such as via an attachment to an email, instant message, or otherwise exchanged via a network, or when a client device receives such a file or input string, DNS module 134 uses the file or input string (or a computed hash or signature, or other unique identifier, etc.) as a query to security platform 140. In other implementations, an inline security entity queries a mapping of hashes/signatures to traffic classifications (e.g., indications that the traffic is C2 traffic, indications that the traffic is malicious traffic, indications that the traffic is benign/non-malicious, etc.). This query can be performed contemporaneously with receipt of the file or input string, or in response to a request from a user to scan the file. As one example, data appliance 102 can send a query (e.g., in the JSON format) to a frontend 142 of security platform 140 via a REST API. Using processing described in more detail below, security platform 140 will determine (e.g., using a malicious file detector that may use a machine learning model to detect/predict whether the file is malicious) whether the queried file is a malicious file (or likely to be a malicious file) and provide a result back to data appliance 102 (e.g., "malicious file" or "benign file").

In some embodiments, network traffic classifier 170 provides to a security entity, such as data appliance 102, an indication of the traffic classification. For example, in response to detecting the C2 traffic, network traffic classifier 170 sends an indication that the sample corresponds to C2 traffic to data appliance 102, and the data appliance 102 may in turn enforce one or more policies (e.g., security policies) based at least in part on the indication. The one or more security policies may include isolating/quarantining the content (e.g., webpage content) for the domain, blocking access to the domain (e.g., blocking traffic for the domain), isolating/deleting the domain access request for the domain, ensuring that the domain is not resolved, alerting or prompting the user of the client device the maliciousness of the domain prior to the user viewing the webpage, blocking traffic to or from a particular node (e.g., a compromised device, such as a device that serves as a beacon in C2 communications), etc. As another example, in response to determining the application for the sample, network traffic classifier 170 provides to the security entity an update of a mapping of signatures to applications (e.g., application identifiers).

Figure 2:
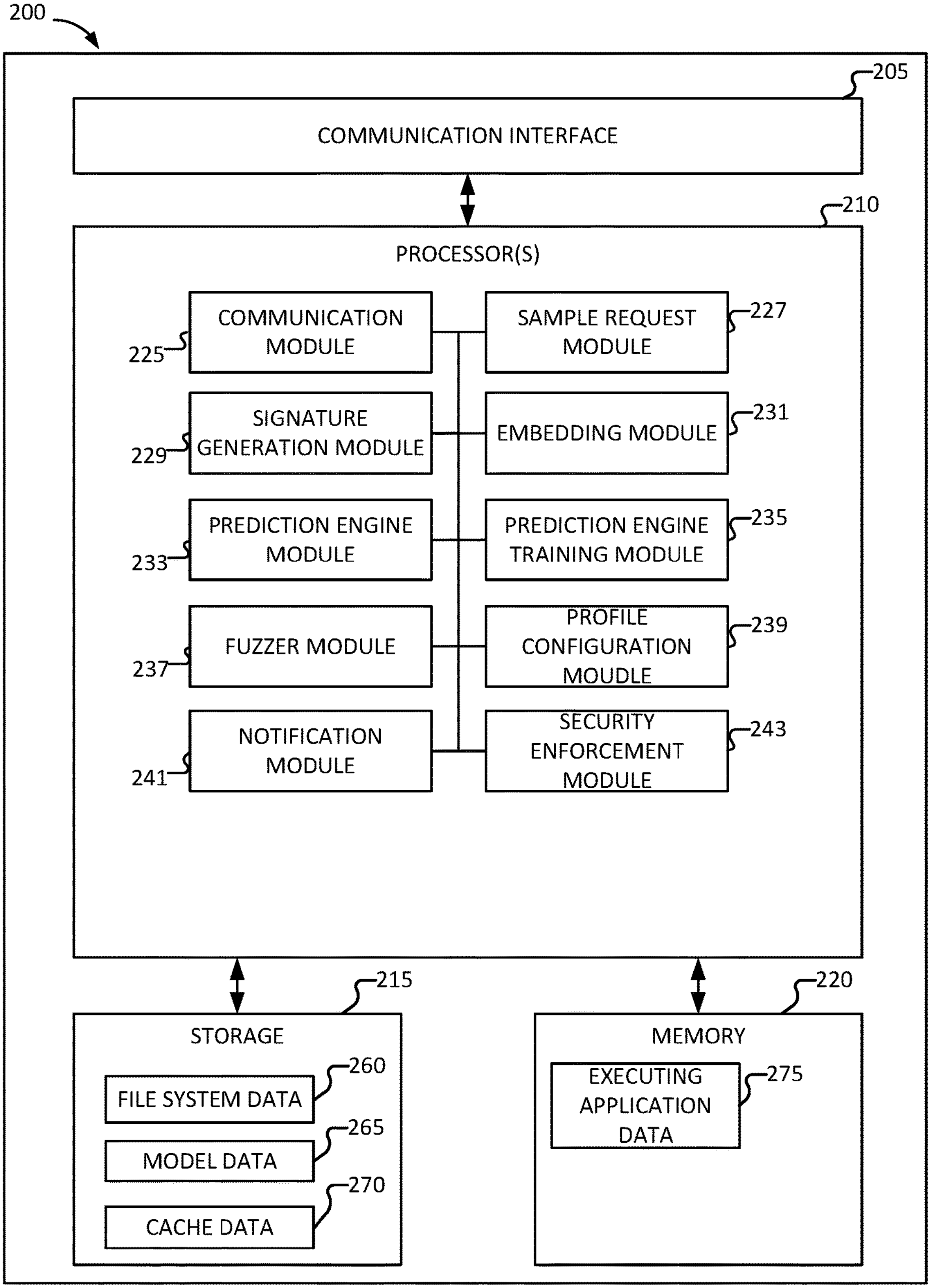
FIG. 2 is a block diagram of system for detecting and handling Command and Control (C2) traffic according to various embodiments.

FIG. 2 is a block diagram of system for detecting and handling Command and Control (C2) traffic according to various embodiments. According to various embodiments, system 200 is implemented in connection with system 100 of FIG. 1, such as for network traffic classifier 170. In various embodiments, system 200 is implemented in connection with process 800 of FIG. 8, process 900 of FIG. 9, process 1000 of FIG. 10, process 1100 of FIG. 11, process 1200 of FIG. 12, process 1300 of FIG. 13, process 1400 of FIG. 14, and/or process 1500 of FIG. 15. System 200 may be implemented in one or more servers, a security entity such as a firewall, and/or an endpoint.

System 200 can be implemented by one or more devices such as servers. System 200 can be implemented at various locations on a network. In some embodiments, system 200 implements network traffic classifier 170 of system 100 of FIG. 1. As an example, system 200 is deployed as a service, such as a web service (e.g., system 200 determines whether traffic corresponding to a particular traffic sample is malicious or C2 traffic, and provides such determinations as a service). The service may be provided by one or more servers. For example, system 200 or network traffic classifier is deployed on a remote server that monitors or receives network traffic that is transmitted within or into/out of a network and determines the traffic classification (e.g., whether the traffic is C2 traffic, whether the traffic is malicious, whether the traffic is non-malicious, etc.) and sends/pushes out notifications or updates pertaining to the network traffic such as an indication of the application to which the network traffic corresponds or an indication of whether an application is malicious. As another example, the network traffic classifier is deployed on a firewall. In some embodiments, part of system 200 is implemented as a service (e.g., a cloud service provided by one or more remote servers) and another part of system 200 is implemented at a security entity or other network node such as a client device.

In some embodiments, system 200 receives network traffic and predicts a traffic classification (e.g., whether the traffic is C2 traffic, malicious traffic, or non-malicious traffic, etc.). System 200 can perform an active measure (or cause an active measure to be performed) in response to determining the traffic classification. For example, system 200 performs an active measure in response to determining that the traffic is C2 traffic (e.g., detecting C2 traffic). As another example, system 200 handles the traffic according to normal/benign traffic in response to determining that the traffic is not C2 traffic or is otherwise not malicious traffic.

In the example shown, system 200 implements one or more modules in connection with generating a set of network traffic samples to train/update a classifier, training/updating a classifier, predicting a traffic classification, determining a likelihood that traffic is C2 traffic or malicious traffic, determining a likelihood that traffic is benign/non-malicious traffic etc. System 200 comprises communication interface 205, one or more processor(s) 210, storage 215, and/or memory 220. One or more processors 210 comprises one or more of communication module 225, sample request module 227, signature generation module 229, embedding module 231, prediction engine module 233, prediction engine training module 235, fuzzer module 237, profile configuration module 239, notification module 241, and security enforcement module 243.

In some embodiments, system 200 comprises communication module 225. System 200 uses communication module 225 to communicate with various nodes or end points (e.g., client terminals, firewalls, DNS resolvers, data appliances, other security entities, etc.) or user systems such as an administrator system. For example, communication module 225 provides to communication interface 205 information that is to be communicated (e.g., to another node, security entity, etc.). As another example, communication interface 205 provides to communication module 225 information received by system 200. Communication module 225 is configured to receive an indication of samples (e.g., HTTP requests, URLs, URIs, network traffic, etc.) to be analyzed, such as from network endpoints or nodes such as security entities (e.g., firewalls), database systems, query systems, etc. Communication module 225 is configured to query third party service(s) for information pertaining to the network traffic classifications (e.g., services that expose information/classifications for signatures/hashes of network traffic such as third-party scores or assessments of maliciousness of particular traffic, a community-based score, assessment, or reputation pertaining to domains or applications, a blacklist for domains, applications, or certain types/signatures of network traffic such as HTTP requests, and/or a whitelist for domains, applications, or other certain types of network traffic, etc.). For example, system 200 uses communication module 225 to query the third-party service(s). Communication module 225 is further configured to receive one or more settings or configurations from an administrator. Examples of the one or more settings or configurations include configurations of a process determining whether a particular type of traffic (e.g., a particular HTTP request) is permitted, malicious, benign, etc., a format or process according to which a feature vector or embedding is to be determined, a set of feature vectors or embeddings to be provided to a classifier for determining the traffic classification (e.g., for predicting whether traffic is C2 traffic, or predicting whether the traffic is malicious/non-malicious), a set of predefined signatures to be assessed or counted, information pertaining to a whitelist of domains, applications, nodes, or signatures for traffic (e.g., traffic that is not deemed suspicious or malicious), information pertaining to a blacklist of domains, applications, nodes, or signatures for traffic (e.g., traffic that is deemed to be suspicious or malicious and for which traffic is to be quarantined, deleted, or otherwise to be restricted from being executed/transmitted), etc.

In some embodiments, system 200 comprises sample request module 227. System 200 uses sample request module 227 to obtain a request to perform a traffic classification (e.g., predict a traffic classification or otherwise classify a sample as malicious, benign, or C2 traffic, etc.). Sample request module 227 may obtain a network traffic sample collected by an inline security entity, such as a firewall, or a network traffic for which another system or service requests a predicted traffic classification. Sample request module 227 may further obtain a request (or other indication) to train or update a classifier and/or a request for a set of network traffic samples for training/updating the classifier. For example, system 200 retrains/updates a classifier according to a predefined frequency or in response to one or more criteria being satisfied (e.g., the criteria can be defined in an updating policy, etc.).

In some embodiments, system 200 comprises signature generation module 229. System 200 uses signature generation module 229 to generate a signature pertaining to a network traffic sample for which system 200 is classifying (e.g., predicting a traffic classification). Signature generation module 229 can generate the signature according to a predefined process. For example, signature generation module 229 implements a hashing algorithm to determine a hash for the network traffic sample. Signature generation module 229 may determine the hash for the network traffic sample based on hashing the header of the network traffic sample. Example of hashing algorithms that may be implemented in connection with determining a signature include MD5, SHA-1, SHA-2, SHA-256, NTLM, LANMAN, RIPEMD-160, etc. Various other predefined processes may be implemented to determine the signature.

In some embodiments, system 200 comprises embedding module 231. System 200 uses signature embedding module 231 to perform an embedding (or feature) extraction with respect to a particular network traffic sample. In some embodiments, system 200 uses feature embedding module 231 to determine a set of feature vectors or a combined feature vector to use in connection with classifying a sample, such as determining whether a sample (e.g., the network traffic sample) is malicious (e.g., using a detection model, such as a classifier). In some embodiments, embedding module 231 determines a set of one or more feature vectors based at least in part on information pertaining to the sample. For example, embedding module 231 determines feature vectors for (e.g., characterizing) the one or more of (i) a set of regex statements (e.g., predefined regex statements), and/or (ii) one or more characteristics or relationships determined based on an algorithmic-based feature extraction. Signature embedding module 231 may determine embeddings for the network traffic sample based at least in part on the network traffic sample header, etc.

In some embodiments, system 200 comprises prediction engine module 233. System 200 uses prediction engine module 233 to System 200 uses prediction engine module 233 to determine a traffic classification, such as to predict whether the sample corresponds to C2 traffic, predict whether the sample corresponds to malicious traffic, and/or predict whether the sample corresponds to benign/non-malicious traffic. Prediction engine module 233 determines the traffic classification based on querying a classifier, such a machine learning model. In some embodiments, the classifier is a CNN model that predicts the traffic classification based on the header embeddings.

Prediction engine module 233 may query the classifier and obtain an indication of a likelihood that the sample corresponds to C2 traffic. Prediction engine module 233 may determine that the sample corresponds to C2 traffic in response to determining the likelihood that the sample corresponds to C2 traffic obtained based on querying the classifier exceeds a predefined C2 likelihood threshold.

According to various embodiments, prediction engine module 233 implements a classifier (e.g., a machine learning model) to classify the network traffic (e.g., an obtained sample or record from a network traffic log) based on the embeddings. System 200 may train the classifier, or system 200 may obtain the classifier from a service. The classifier is trained based at least in part on a machine learning process. Examples of machine learning processes that can be implemented in connection with training the classifier(s) include random forest, linear regression, support vector machine, naive Bayes, logistic regression, K-nearest neighbors (KNN), decision trees, gradient boosted decision trees, K-means clustering, hierarchical clustering, density-based spatial clustering of applications with noise (DBSCAN) clustering, principal component analysis, a convolutional neural network (CNN), etc. In some embodiments, system 200 implements a CNN model. The classifier provides a predicted classification (e.g., a machine learning-based predicted classification), such as a prediction of whether the traffic is C2 traffic, a prediction of whether the corresponding traffic (e.g., domain corresponding to the access path) is malicious, or a likelihood that the traffic is malicious (e.g., whether the traffic is exploit traffic).

In some embodiments, system 200 comprises prediction engine training module 235. System 200 uses prediction engine training module 235 to train a classifier, such as a machine learning model used to perform traffic classification (e.g., to predict whether a sample corresponds to C2 traffic, or to identify a particular C2 traffic to which the sample corresponds). In connection with training the classifier, prediction engine training module 235 collects a training set of samples. Samples in the training set may collected from one or more of (i) network traffic (e.g., monitored network traffic that was previously classified), (ii) a third-party service that provides a set of previously classified samples (e.g., a whitelist of benign samples, a blacklist of malicious samples, etc.), or (iii) generating the network traffic samples, such as by creating a fuzzing. In some embodiments, prediction engine training module 235 obtains the generated network traffic samples based at least in part on invoking fuzzer module 237 and/or profile configuration module 239.

In some embodiments, system 200 comprises fuzzer module 237. System 200 uses fuzzer module 237 to generate a fuzzing. For example, fuzzer module 237 generates a set of network traffic samples based at least in part on a set of profile configurations. Fuzzer module 237 may generate the set of network traffic samples probabilistically (e.g., randomly). In some embodiments, C2 fuzzer 310 of system 300 is implemented by fuzzer module 237. In connection with generating the set of network traffic samples, system 300 (e.g., fuzzer module 237) obtains a profile configuration from which the set of network traffic samples are generated. The profile configuration may be obtained based at least in part on invoking profile configuration module 239.

In some embodiments, system 200 comprises profile configuration module 239. System 200 uses profile configuration module 239 to obtain a set of profiles (e.g., profile configurations) that are to be used in connection with generating network traffic. Profile configuration module 239 obtains a set of profiles or profile seeds based at least in part on querying an LLM to provide a set of profiles or profile seeds similar to a profile suggestion. For example, profile configuration module 239 obtains a profile suggestion (e.g., a sample profile configuration for a known malicious sample or known benign sample) from fuzzer module 237 or a pre-stored dataset of known samples. In response to obtaining the profile suggestion, profile configuration module 239 queries LLM 315 for a set of profiles or profile seeds. The querying of the LLM 315 may include requesting that the LLM provide examples of profiles similar to the profile suggestion. In some embodiments, profile orchestrator 305 and/or LLM 316 is implemented by profile configuration module 239.

In some embodiments, system 200 comprises notification module 241. System 200 uses notification module 241 to provide an indication of the traffic classification, such as an indication whether the traffic is malicious, an indication whether the traffic is C2 traffic, etc. Notification module 241 provides the indication (e.g., the report) to another system or service, such as inline security or other security entity requesting the traffic classification or otherwise handling the traffic, or an administrator system (e.g., used by a network administrator while evaluating a security policy posture, etc.), etc. Notification module 241 may also provide an indication of an active measure to be implemented or a recommendation for an active measure to be implemented (e.g., a recommendation for handling the traffic based on the traffic classification, etc.).

System 200 may use notification module 241 to provide to one or more security entities (e.g., a firewall), nodes, or endpoints (e.g., a client terminal) an update to a whitelist of traffic, such as a whitelist of IP addresses (e.g., IP addresses from which HTTP requests originate) or a whitelist of traffic signatures (e.g., hashes for samples deemed to be benign). According to various embodiments, notification module 241 obtains a hash, signature, or other unique identifier associated with the domain (e.g., a webpage for the domain) or network traffic, and provides the indication of whether the sample is malicious in connection with the hash, signature, or other unique identifier associated with the sample.

According to various embodiments, the hash of a sample corresponds to a hash of an IP address (e.g., the IP address from which the HTTP request originates), a hash of header information, a hash of header information that is formatted according to a predefined format, etc. A security entity or an endpoint may compute a hash of a sample or traffic monitored/analyzed. The security entity or an endpoint may determine whether the computed hash corresponding to the sample is comprised within a set such as a whitelist of benign traffic, and/or a blacklist of traffic, etc. If a signature for a received sample is included in the set of signatures for samples previously deemed malicious (e.g., a blacklist of samples), the security entity or an endpoint can prevent the transmission of the corresponding traffic or prevent traffic to/from a client device from which C2 traffic was collected.

In some embodiments, system 200 comprises security enforcement module 243. System 200 uses security enforcement module 243 enforces one or more security policies with respect to information such as network traffic, files, etc. System 200 may use security enforcement module 243 to perform an active measure with respect to the network traffic in response to detecting the that the traffic corresponds to C2 traffic. Security enforcement module 243 enforces the one or more security policies based on whether the file is determined to be malicious. As an example, in the case of system 200 being a security entity (e.g., a firewall) or firewall, system 200 comprises security enforcement module 243. Firewalls typically deny or permit network transmission based on a set of rules. These sets of rules are often referred to as policies (e.g., network policies, network security policies, security policies, etc.). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies. Other examples of policies include security policies such as ones requiring the scanning for threats in incoming (and/or outgoing) email attachments, website content, files exchanged through instant messaging programs, and/or other file transfers.

According to various embodiments, storage 215 comprises one or more of filesystem data 260, model data 265, and/or cache data 270. Storage 215 comprises a shared storage (e.g., a network storage system) and/or database data, and/or user activity data.

In some embodiments, filesystem data 260 comprises a database such as one or more datasets (e.g., one or more datasets for domains, datasets comprising samples of network traffic, mappings of indications for network traffic or predicted traffic classifications for network traffic to the network traffic or hashes, signatures or other unique identifiers of the network traffic, such as a signature for the domains, mappings of indicators of benign traffic to hashes, signatures or network traffic, datasets for a set of profile seeds, datasets for a set of profiles generated based on the profile seeds, dataset for network traffic generated based on the profile seeds, etc.). Filesystem data 260 comprises data such as historical information pertaining to HTTP request data or network traffic, a whitelist of network traffic profiles (e.g., hashes or signatures for the HTTP request data) or IP addresses deemed to be safe (e.g., not suspicious, benign, etc.), a blacklist of network traffic profiles deemed to be suspicious or malicious, etc.

Model data 265 comprises information pertaining to one or more models used to predict traffic classification, or to predict a likelihood that the network traffic corresponds to a particular type of traffic (e.g., C2 traffic, generally malicious traffic, or non-malicious traffic, etc.). As an example, model data 265 stores the classifier (e.g., a CNN machine learning classifier model(s) such as a detection model) used to detect malicious traffic or otherwise provide a predicted traffic classification. The classifier may use a set of header embeddings or other feature vector associated with the header information (e.g., header information for HTTP request data). Model data 265 comprises a header embedding that may be generated with respect to one or more characteristics of the network traffic. Model data 265 may comprise a classifier that detects C2 traffic across a plurality of C2 framework. Model data 265 may comprise a set of classifiers, each of which is respectively configured to detect traffic for a particular C2 framework.

Cache data 270 comprises information pertaining to generated profile seed(s), generated profiles, generated network traffic samples (e.g., a fuzzing), a predicted traffic classifications for network traffic, such as predictions of whether the traffic is C2 traffic. For example, cache data 270 stores an indication that the network traffic is C2 traffic, an indication of a likelihood that the network traffic is malicious traffic, an indication of a likelihood that the network traffic is benign/non-malicious traffic, etc. As another example, cache data 270 stores an indication of a particular C2 framework to which network traffic (e.g., an exploit associated with the network traffic) corresponds.

The information pertaining to a determination can be obtained by notification module 241 and provided in response to the classification (e.g., communicated to the applicable security entity, endpoint, or other system).

In some embodiments, cache data 270 comprises hashes or signatures for traffic samples (e.g., HTTP requests) that are analyzed by system 200 to determine whether the traffic samples correspond to malicious traffic (e.g., C2 traffic), or a historical dataset that has been previously assessed to determine whether the traffic samples are malicious, such as historical determinations provided by a third party. Cache data 270 can include a mapping of hash values or other identifiers associated with network traffic (e.g., access paths) to indications of the traffic classifications.

According to various embodiments, memory 220 comprises executing application data 275. Executing application data 275 comprises data obtained or used in connection with executing an application such as an application executing a hashing function, an application to extract information from webpage content, an input string, an application to extract information from a file, or other sample, etc. In embodiments, the application comprises one or more applications that perform one or more of generate profiles (e.g., C2 profile configurations), a set of profile seeds, and/or sample network traffic, receive and/or execute a query or task, generate a report and/or configure information that is responsive to an executed query or task, and/or provide to a user information that is responsive to a query or task. Other applications comprise any other appropriate applications (e.g., an index maintenance application, a communications application, a machine learning model application, an application for detecting suspicious input strings, suspicious files, an application for detecting suspicious or unparked domains, an application for detecting malicious network traffic or malicious/non-compliant applications such as with respect to a corporate security policy, a document preparation application, a report preparation application, a user interface application, a data analysis application, an anomaly detection application, a user authentication application, a security policy management/update application, etc.).

Figure 3A:
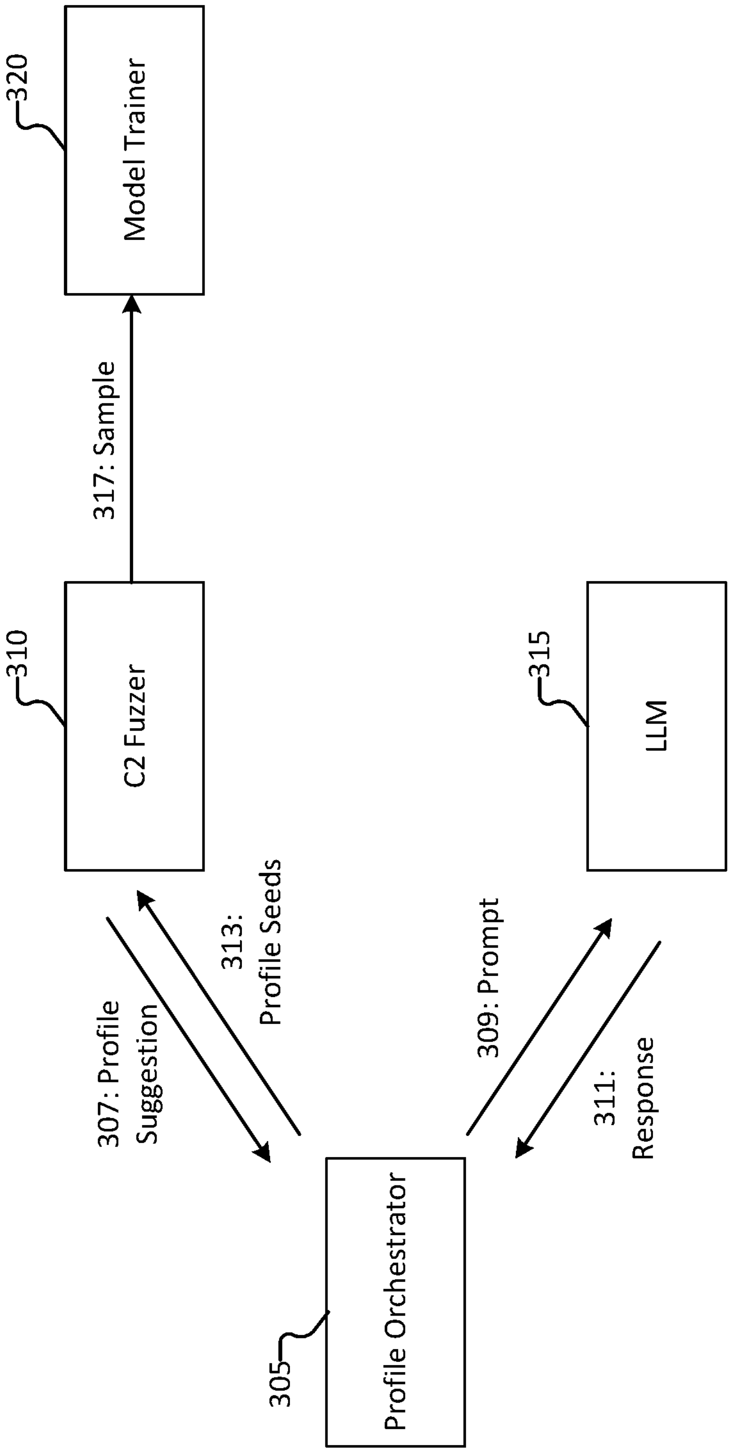
FIG. 3A is a system for generating C2 traffic samples to train a classifier according to various embodiments.

FIG. 3A is a system for generating C2 traffic samples to train a classifier according to various embodiments. In some embodiments, system 300 generates sample network traffic with which a classifier (e.g., a C2 machine learning detection model) is trained. System 300 may probabilistically (e.g., randomly) generate the sample network traffic, such as by obtaining profile seeds from an LLM (e.g., an LLM-based profile generator). Accordingly, system 300 obtains a set of different profiles (e.g., profile seeds) with which a fuzzer generates the sample network traffic.

In some embodiments, system 300 can fully automate the process of generating C2 traffic based on a generated profile. The different C2 traffic used to collect a different C2 traffic dataset. For example, system 300 collects different C2 traffics for training a classifier configured to detect C2 traffic. In connection with generating the sample C2 traffic for training/updating the classifier, system 300 can generate C2 traffic of a particular type of C2 framework, or different subsets of C2 traffic for different types of C2 frameworks. In some embodiments, system 300 trains/updates a model specifically configured to detect a C2 traffic corresponding particular C2 framework (e.g., Cobalt Strike). System 300 may train a plurality of models, where each of the plurality of models corresponds to a different C2 framework. In some embodiments, system 300 trains/updates a model to detect C2 traffic across a plurality of frameworks (e.g., a model that detects both C2 traffic using the Cobalt Strike framework, and C2 traffic using the Empire framework). Examples of C2 frameworks include Cobalt Strike, Empire, Covenant, Deimos and Silver, etc.

System 300 employs an LLM as the seed generator mutator for C2 profile generation (e.g., a profile for a particular C2 framework, such as the Empire framework). System periodically generates new seeds based on the quality of existing generated seeds and/or the quality of existing network traffic samples used to train/update the classifier. System 300 may comprise a fuzzer that is configured to mutate the existing profile seeds to generate new ones. System 300 collects (e.g., determines) the code coverage for these seeds, and utilizes the code coverage as the metric to evaluate the quality of generated profiles.

In some embodiments, system 300 implements a C2 framework driver (e.g., an Empire C2 driver) to access a malleable C2 profile, and generates C2 traffic accordingly. Related art fuzzers will randomly mutate seeds as inputs. In contrast, system 300 uses an input that is a structural input, such as a file object, to generate the C2 traffic. The related art fuzzers that randomly mutate seeds may generate many sub-optimal/useless seeds that do not lead to generation of good network traffic samples. In some embodiments, system 300 avoids generating too many useless seeds based on leveraging LLMs to generate profile seeds (e.g., the C2 profiles).

In the example shown, system 300 comprises profile orchestrator 305, C2 fuzzer 310, LLM 315, and model trainer 320. Profile orchestrator 305 orchestrates the generation of profiles from which a set of network traffic samples is generated. LLM 315 generates (e.g., randomly or probabilistically) a set of profile seeds from which different network traffic samples are generated. C2 fuzzer 310 creates a fuzzing, such as a set of malicious C2 traffic. C2 fuzzer 310 creates the fuzzing based on the set of profile seeds obtained from the LLM. Model trainer 320 uses the fuzzing (e.g., a set of network traffic samples) to train or update (e.g., retrain) a classifier (e.g., a machine learning model for detecting C2 traffic).

Profile orchestrator 305 may be a module, system, or service for obtaining profiles (or at least profile seeds) and providing the profiles/seeds to C2 fuzzer 310. Profile orchestrator obtains a profile suggestion and obtains a set of one or more profile seeds based at least in part on the profile suggestion. In the example shown, at 307, profile orchestrator 305 receives a profile suggestion from C2 fuzzer 310. Profile orchestrator 305 may query C2 fuzzer 310 for the profile suggestion, such as in response to determining that a classifier is to be trained or updated. In response to receiving the profile suggestion (e.g., from C2 fuzzer 310), profile orchestrator 305 obtains one or more profile seeds (e.g., a set of profile seeds), such as by querying another system or service (e.g., an LLM). At 309, profile orchestrator 305 prompts LLM 315 for a profile seed(s). Profile orchestrator 305 may prompt LLM 315 based at least in part on the profile suggestion. An example of a query that profile orchestrator 305 may send to LLM 315 is query 500 of FIG. 5A. At 311, LLM 315 returns the profile seed(s). The query may request that the LLM provide a specific number of profile seed(s), or LLM 315 may provide a certain number of profile seed(s) based on a qualitative request for some sample profile seeds. Profile orchestrator 305 obtains the profile seed(s) at 311 and uses the profile seed(s) to generate a fuzzing, such as a set of network traffic. For example, at 313, profile orchestrator 305 provides the profile seed(s) to C2 fuzzer 310. C2 fuzzer receives the profile seed(s) at 313 and generates the fuzzing (e.g., network traffic samples). At 317, the fuzzing or set of network traffic samples are provided to model trainer 320. Model trainer 320 obtains set of network traffic samples to train or update a classifier (e.g., a machine learning model configured to detect C2 traffic). In some embodiments, model trainer 320 implements a machine learning technique to train/update the classifier.

FIG. 3B is an example of HTTP traffic generated according to various embodiments. In the example shown, traffic 350 corresponds to HTTP traffic based on a C2 profile, such as profile 750 of FIG. 5B. As illustrated in HTTP traffic 360, a session key is embedded in the HTTP header that is encoded by "netbiosu" and appended to the string "/UTWOqVQ132/", which is the same encoding and string as in the profile (e.g., profile 750) used to generate the HTTP traffic.

In some embodiments, the system implements a domain specific language in connection with generating sample network traffic. For example, the system implements malleable C2, which is a domain specific language, to redefined indicators in a beacon's communication. A C2 profile comprises several set operations and blocks. The set operation can set a value to a key. For example, each set operation sets the value to a key. The block is grouped by curly braces (e.g., "{", and "}").

In some embodiments, the system uses a malleable C2 traffic to quickly and efficiently generate different samples of network traffic (e.g., C2 traffic), which can be used to train a classifier. The system can obtain a set of profile seeds (e.g., randomly generated profile seeds, such as from an LLM) and use the set of profiles seeds and the malleable C2 language to generate many a set of malicious network traffic samples. Generally, the Empire C2 framework would generate the same HTTP indicators for attacks.

Figure 4A:
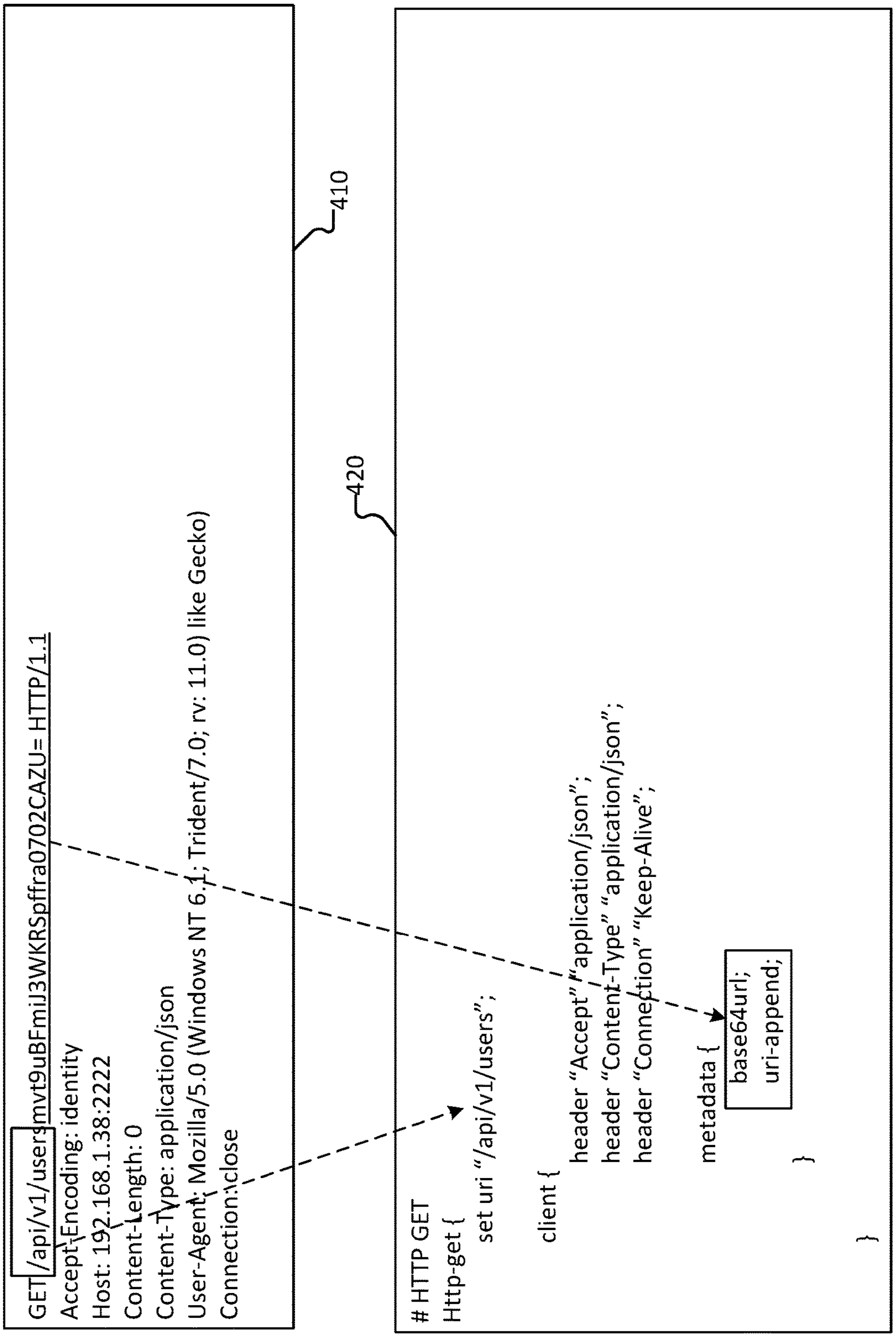
FIG. 4A is an example of a mapping between an HTTP header and a malicious profile according to various embodiments.

FIG. 4A is an example of a mapping between an HTTP header and a malicious profile according to various embodiments.

A malicious attacker can control the malleable profile to mutate its HTTP indicators to bypass signature-based detections. In the example mapping 400 shown in FIGS. 4A and 4B, the attacker launches a privilege escalation attack on the victim machine, and utilizes the profile 420 to set up HTTP requests comprising HTTP header 410. Profile 420 corresponds to the profile configuration from which the actual traffic is generated during the C2 session. In the example shown, profile 420 sets the URI for its http request with the value "/api/v1/ users". Profile 420 sets "base64" as its encoding algorithm. Profile 420 encodes its session key with "base64" and appends to URI.

Figure 4B:
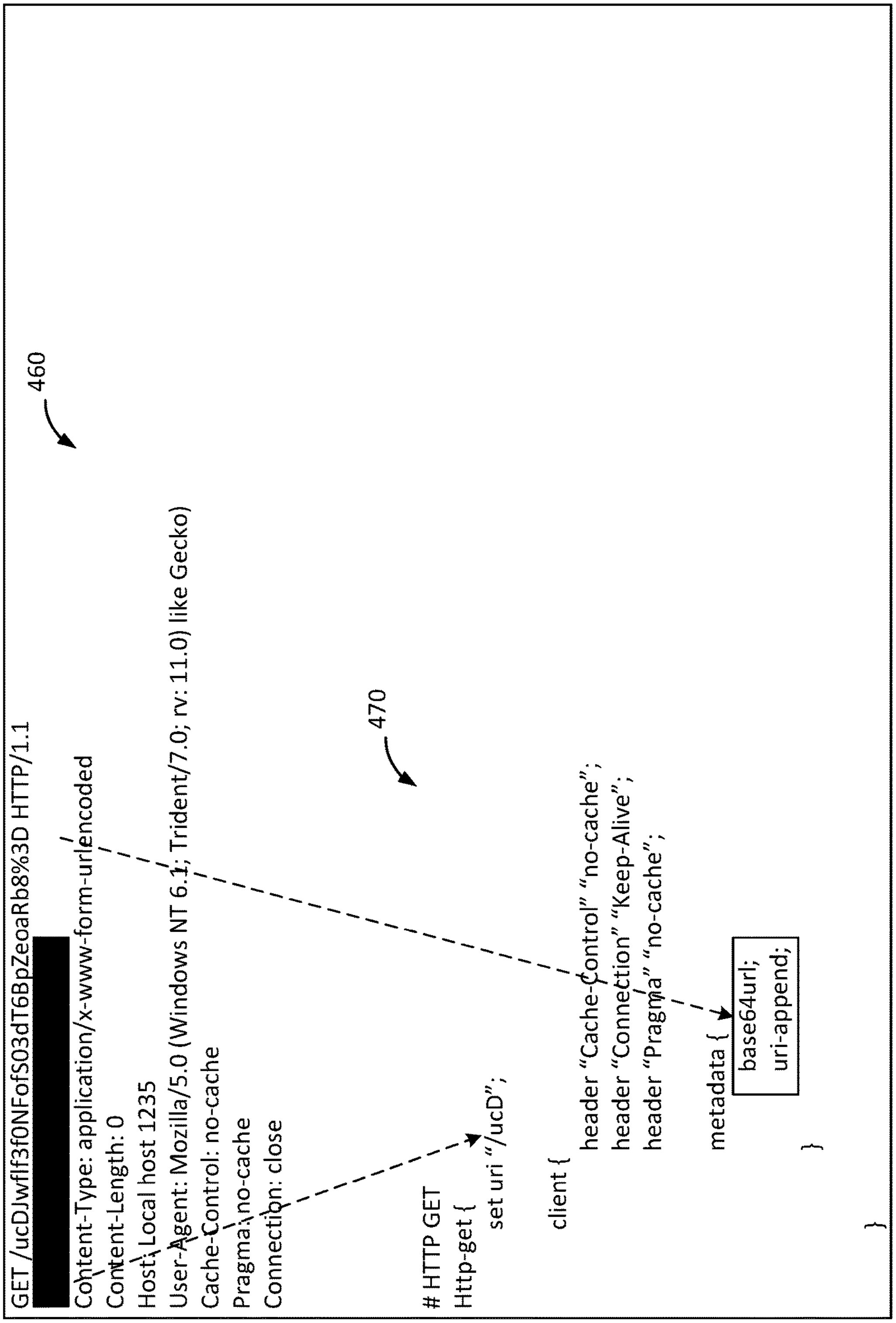
FIG. 4B is an example of a mapping between an HTTP header and a modified malicious profile according to various embodiments.

FIG. 4B is an example of a mapping between an HTTP header and a modified malicious profile according to various embodiments.

A malicious attacker could set up different HTTP requests for the same attack by periodically updating its malleable profile. In this case, the attacker could use the profile comprised in the example profile 450 shown in FIG. 4B. As illustrated by HTTP header 460, the malicious attacker can generate HTTP traffic that is significantly different from traffic comprising HTTP header 410. As a result, a signature-based detection approach would fail to successfully detect the second attack (e.g., the attack based on profile 450), if the signature-based detection approach only relies on the signature from the HTTP traffic corresponding to HTTP header 410 generated using profile 420.

In contrast, various embodiments implement a machine learning based approach to train a reliable model to tolerate these variances, such as by using a sufficiently large training set.

Figure 5A:
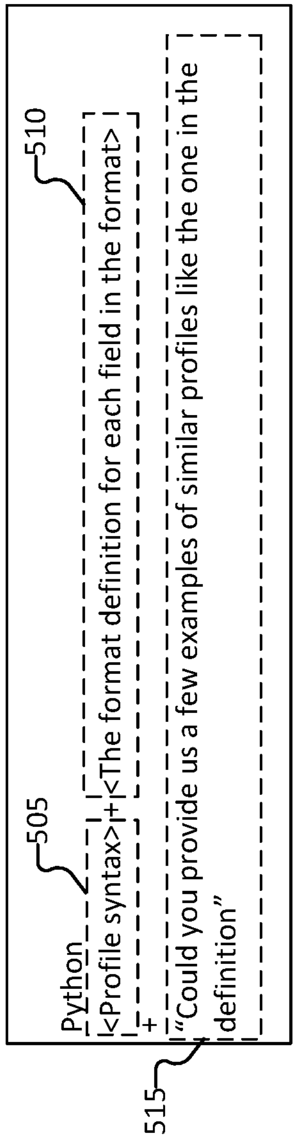
FIG. 5A is an example of a profile seed definition provided to a large language model (LLM) to obtain a sample profile seed according to various embodiments.
Figure 5B:
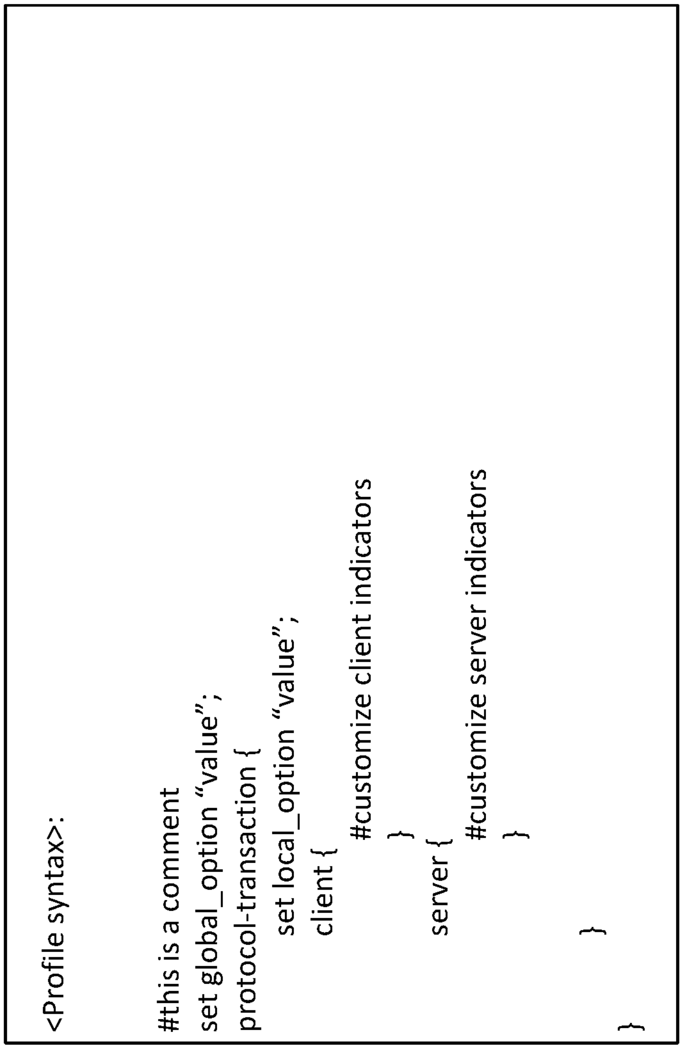
FIG. 5B is an example of a profile syntax for a query provided to a large language model (LLM) to obtain a sample profile seed according to various embodiments.

FIG. 5A is an example of a profile seed definition for a query provided to a large language model (LLM) to obtain a sample profile seed according to various embodiments. FIG. 5B is an example of a profile syntax for a query provided to a large language model (LLM) to obtain a sample profile seed according to various embodiments. FIG. 5C is an example of a format definition for a query provided to a large language model (LLM) to obtain a sample profile seed according to various embodiments.

In some embodiments, the system queries an LLM, such as ChatGPT, etc., for a profile seed based on which the system (e.g., a fuzzer module) generates a sample network traffic. For example, the system obtains a set of profile seeds from the LLM and generates a fuzzing with which the system trains a classifier (e.g., a C2 ML detection model). The query may comprise a profile definition which comprises a profile syntax and a format definition. The query may further comprise a request for a set of profile seeds.

In the example shown, query 500 comprises profile syntax 505, format definition 510, and request 515. Request 515 may be input in natural language and correspond to a request for a set of profile seeds. In some embodiments, request 515 enumerates a specific number of profile seeds requested from the LLM. As an example, syntax 505 may correspond to, or comprise, syntax 550. As an example, format definition 510 may correspond to, or comprise, format definition 575.

FIGS. 6A-6B provide an example of an output from a large language model (LLM) in response to a request for a sample profile seed according to various embodiments. In response to receiving a prompt/query for a profile seed, LLM generates and provides a sample profile seed comprising a first part (e.g., code 600) and a second part (e.g., code 650). As an example, code 600 comprises an HTTP GET block and code 650 comprises an HTTP POST block 655. The HTTP GET block comprises a first part 605 and a second part 610. The HTPT GET block comprises a client block and a server block, and the HTTP POST block comprises a client block and a server block.

FIG. 7A is an example of a format of malleable C2 profile according to various embodiments. Profile format specification 700 is an example of a format of a Malleable C2 profile. Malleable C2 is a domain specific language. As a domain specific language, the Malleable C2 can redefine indicators in a communication by a beacon. A C2 profile comprises several sets of operations and blocks. Each set operation sets the value to a key. The blocks are grouped by curly braces (e.g., "{" and "}"). For example, profile format specification 700 includes a client block and a server block.

FIG. 7B is an example of a partial malleable C2 profile according to various embodiments. Profile 750 is an example of a Malleable C2 profile. Profile 7450 defines an HTTP GET indicator between a stager and a C2 server. The "set uri" operator assigns a uniform resource identifier (URI) that the client and the server will reference during the transaction. The client and server will use the session key for the communication therebetween. The metadata block in the client block specifies how the session key is embedded and transformed into the HTTP GET request. The reference to "netbiosu" and "Uri-append" in the metadata block indicate that the session key information will be encoded by netbiosu and appended to the URI of an HTTP request.

Figure 8:
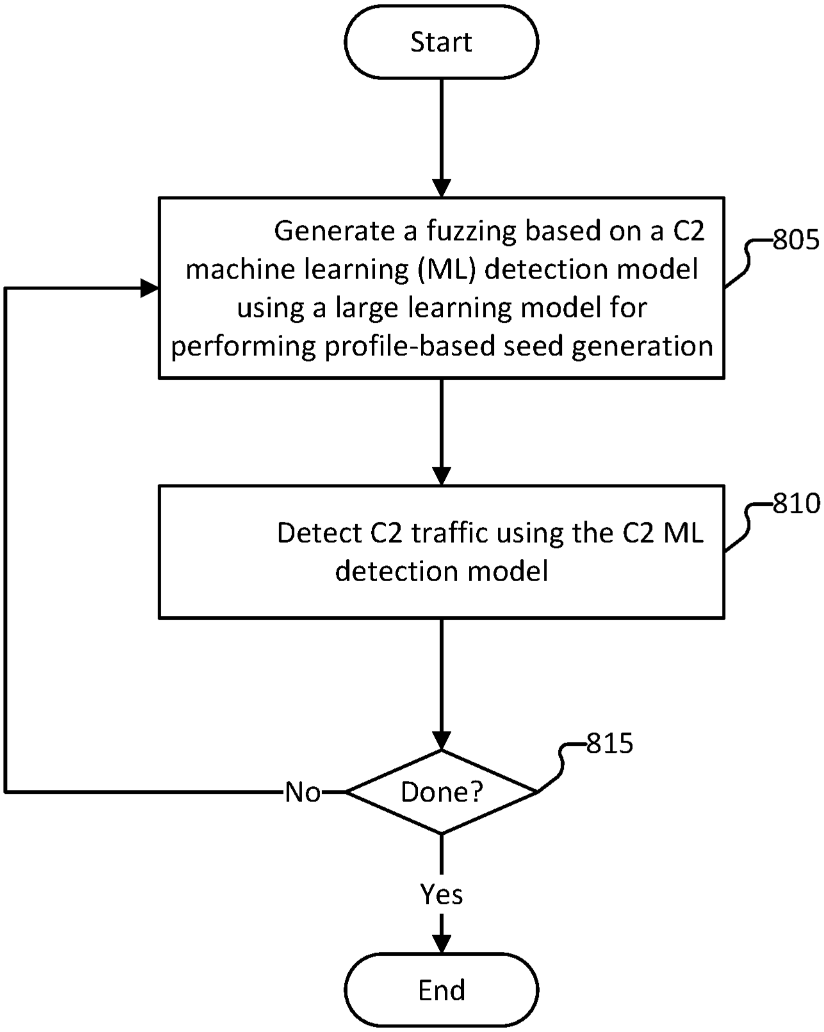
FIG. 8 is a flow diagram of a method for detecting malicious traffic according to various embodiments.

FIG. 8 is a flow diagram of a method for detecting malicious traffic according to various embodiments. In some embodiments, process 800 is implemented at least in part on by system 100 of FIG. 1 and/or system 200 of FIG. 2.

At 805, the system generates a fuzzing based on a C2 machine learning (ML) detection model using a large learning module (LLM) for performing profile-based seed generation. In some embodiments, the system queries an LLM for a set of profile seeds based at least in part on a profile configuration, etc. The system obtains the set of profile seeds from the LLM, and uses the set of profile seeds to generate corresponding C2 traffic samples. The system uses the C2 traffic samples to train the C2 ML detection model.

At 810, the system detects C2 traffic using the C2 ML detection model. In some embodiments, the system obtains a network traffic sample and queries the C2 ML detection model for a traffic classification (e.g., a classification indicating that the sample is malicious or non-malicious/benign). The system queries the C2 ML detection model based at least in part on the network traffic sample. For example, the system determines embeddings or performs feature extraction to determine a set of embeddings/features to be used to query the C2 ML detection module.

At 815, a determination is made as to whether process 800 is complete. In some embodiments, process 800 is determined to be complete in response to a determination that no further samples are to be processed, no further header information is to be processed, no further samples are to be analyzed (e.g., no further predictions for traffic are needed), an administrator indicates that process 800 is to be paused or stopped, etc. In response to a determination that process 800 is complete, process 800 ends. In response to a determination that process 800 is not complete, process 800 returns to 805.

Figure 9:
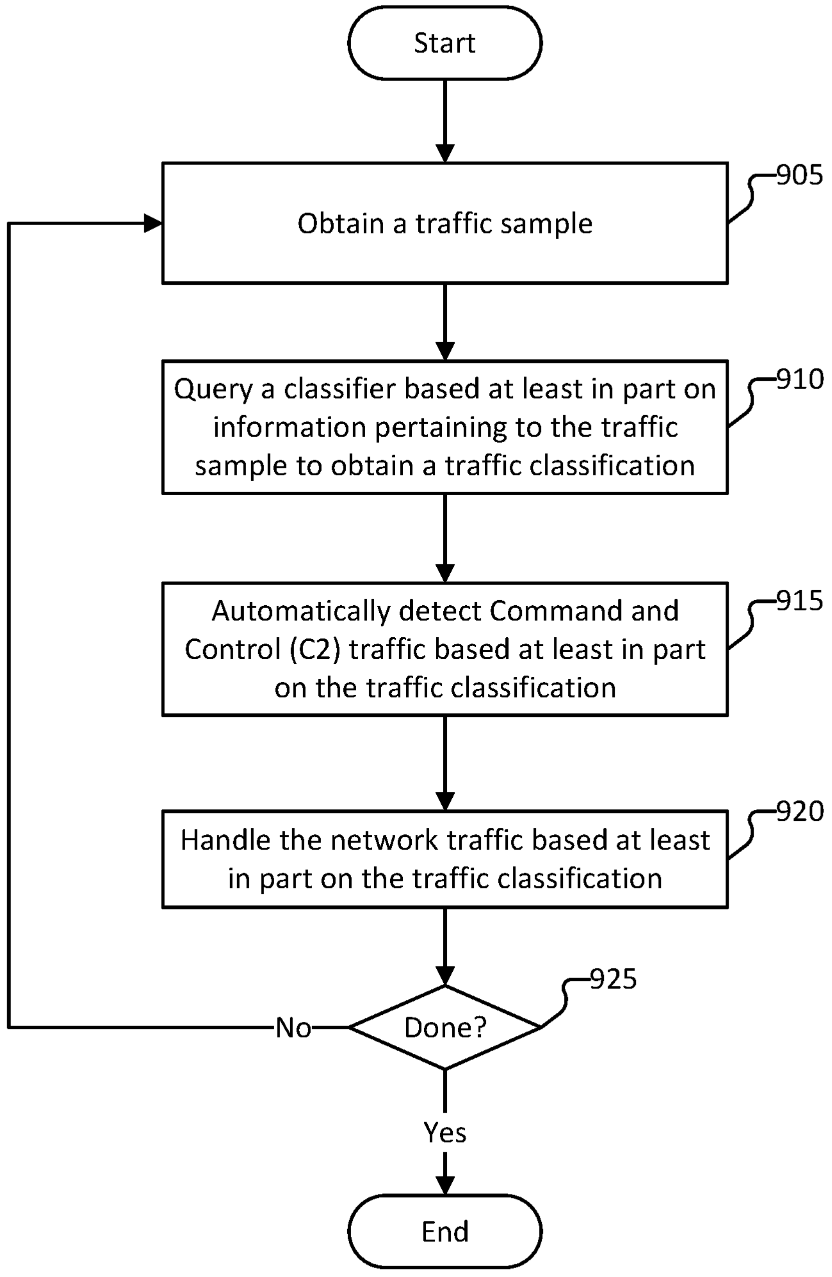
FIG. 9 is a flow diagram of a method for detecting malicious traffic according to various embodiments.

FIG. 9 is a flow diagram of a method for detecting malicious traffic according to various embodiments. In some embodiments, process 900 is implemented at least in part on by system 100 of FIG. 1 and/or system 200 of FIG. 2.

At 905, a header for network traffic is converted to a header representation having a smaller dimensionality than the header. In some embodiments, the header representation corresponds to header embeddings that are input to a classifier, such as a CNN model. The converting the header to the header representation may include processing the header to re-order the header information according to a predefined format and/or to format the secret according to a predefined cookie/secret format. For example, the system identifies the secret in one of the HTTP headers, determines an encoding with which the secret is encoded, and generates a representation for the secret. The representation for the secret may be a tuple of the encoder type and length (e.g., (encoder, length)). Alternatively, the representation for the secret may be a concatenation of information pertaining to the secret, such as a concatenation of the encoder type and length, etc.

At 910, a classifier is queried based at least in part on the header representation to obtain a traffic classification. In some embodiments, the classifier is a CNN model, such as a Bert model, a GPT2 model, etc. The classifier predicts a classification for the network traffic (e.g., a traffic classification). As an example, the system generates header embeddings for the network traffic based at least on the header information (e.g., the header representation). In response to obtaining the header embeddings, the system queries the classifier, and the classifier (e.g., a machine learning model) uses the header embeddings to predict the traffic classification.

At 915, C2 traffic is automatically detected based at least in part on the traffic classification. The system obtains an output/result from the classifier. As an example, in response to obtaining the output/result, the system performs a classification labelling to label the network traffic. As an example, in the event that the output is a likelihood that the traffic is C2 traffic, the classification labelling may include comparing the result to a threshold (e.g., a predefined C2 likelihood threshold) and in response to determining that the result exceeds the threshold, labelling the traffic as C2 traffic, and in response to determining that the result is less than the threshold, labelling the traffic as non-C2 traffic, such as benign traffic.

At 920, the network traffic is handled based at least in part on the traffic classification. In response to determining the traffic classification (e.g., performing the classification labelling), the system handles the network traffic accordingly. For example, if the network traffic is classified as C2 traffic, the system handles the network traffic as C2 traffic. As another example, if the network traffic is classified as benign traffic, the system handles the network traffic as benign. In some embodiments, the system handles the network traffic based at least in part on (i) the traffic classification, and (ii) a security policy. For example, a security policy may define how the system is to handle C2 traffic (e.g., block the traffic, etc.).

At 925, a determination is made as to whether process 900 is complete. In some embodiments, process 900 is determined to be complete in response to a determination that no further samples are to be processed, no further header information is to be processed, no further samples are to be analyzed (e.g., no further predictions for traffic are needed), an administrator indicates that process 900 is to be paused or stopped, etc. In response to a determination that process 900 is complete, process 900 ends. In response to a determination that process 900 is not complete, process 900 returns to 905.

Figure 10:
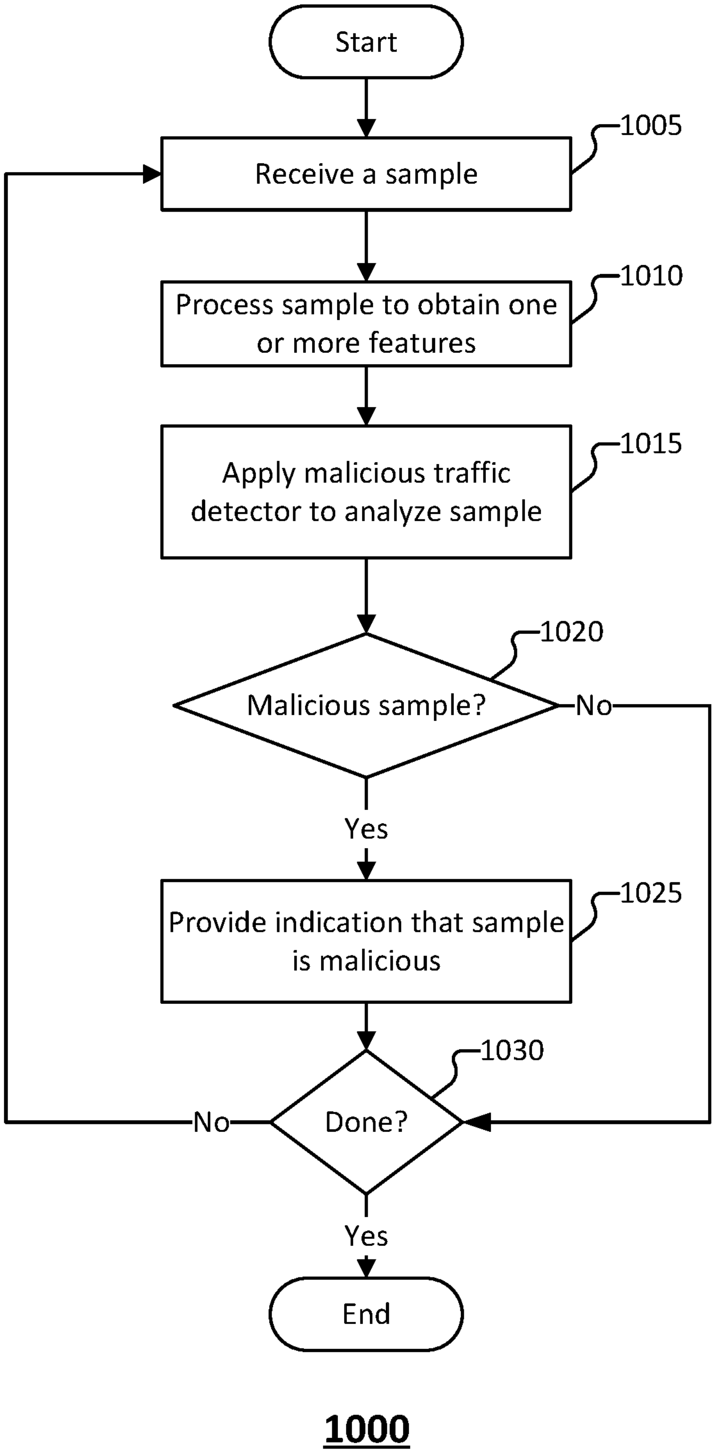
FIG. 10 is a flow diagram of a method for detecting malicious traffic according to various embodiments.

FIG. 10 is a flow diagram of a method for detecting malicious traffic according to various embodiments. In some embodiments, process 1000 is implemented at least in part by system 100 of FIG. 1, system 200 of FIG. 2, and/or system 300 of FIG. 3A. In some implementations, process 1000 may be implemented by one or more servers, such as in connection with providing a service to a network (e.g., a security entity and/or a network endpoint such as a client device). In some implementations, process 1000 may be implemented by a security entity (e.g., a firewall) such as in connection with enforcing a security policy with respect to files communicated across a network or in/out of the network. In some implementations, process 1000 may be implemented by a client device such as a laptop, a smartphone, a personal computer, etc., such as in connection with executing or opening a file such as an email attachment.

At 1005, a sample is received. In some embodiments, the system receives a sample from a security entity (e.g., a firewall), an endpoint (e.g., a client device), etc. For example, in response to receiving network traffic, the security entity or endpoint extracts a traffic sample (e.g., a first packet for an HTTP request, etc.), and the security entity or endpoint provides (e.g., sends) the traffic sample to the system. The sample may be received in connection with a request to determine whether the traffic sample is malicious. For example, the security entity queries the system for a determination of whether the traffic sample is malicious (e.g., for detection of C2 traffic, etc.).

In the case that process 1000 is implemented by a security entity, the sample may be received such as in connection with routing traffic to an applicable network endpoint (e.g., a firewall obtains the sample as traffic is communicated across the firewall). In the case that process 1000 is implemented by a client device, the sample may be received by an application or layer monitoring incoming/outgoing information. For example, a process (e.g., an application, an operating system process, etc.) may run in the background to monitor and obtain HTTP requests being generated, transmitted, etc.

At 1010, the sample is processed to obtain one or more features. For example, the system determines embeddings or features based at least in part on information pertaining to the sample. The system may extract features based on the header for the sample.

In some embodiments, the sample is processed to obtain the header representation. As an example, the header representation is a header embedding that is generated based on a normalized header (e.g., a header that is converted according to a predefined header format, etc.). The secret (e.g., a cookie in the cookie header) may be replaced with a representation identifying properties of the secret. The representation of the secret may be a tuple including the encoding (e.g., a type of encoder used to generate the secret) and the length of the secret (e.g., (base64url, 30)). After the header is processed to be formatted according to the predefined header format (e.g., a re-ordering and formatting of the secret/cookie), such as to obtain a normalized header, the system determines header embeddings.

At 1015, a malicious traffic detector is applied to analyze the sample. In some embodiments, the malicious traffic detector corresponds to, or is similar to, a machine learning (e.g., ML model 176), prediction engine module 233, etc. The malicious traffic detector may implement a machine learning process to analyze the sample (e.g., the embeddings for the sample, such as header embeddings) corresponding to the sample. The machine learning process may determine whether the sample is malicious (or a likelihood that the sample is malicious) based at least in part on the header embeddings.

Various embodiments use a machine learning model to detect malicious traffic based at least in part on the header information comprised in the traffic samples, such as header information in HTTP requests. As an example, the text classification model can be a machine learning or deep learning model that learns from the characters, tokens or terms in the headers of malicious and/or benign traffic.

At 1020, a determination of whether the sample is malicious is performed. In some embodiments, the system determines whether the sample is malicious based at least in part on the analysis of the sample using the malicious traffic detector. If the output from the malicious traffic detector is an indication of a likelihood that the sample is malicious traffic (e.g., C2 traffic), the system compares the likelihood to a predefined maliciousness likelihood threshold (e.g., a C2 likelihood threshold) to determine whether the sample is classified as malicious traffic (e.g., C2 traffic).

In some embodiments, in response to malicious traffic detector determining that the sample is malicious, or in response to a likelihood generated by malicious traffic detector that the sample is malicious exceeding a predefined likelihood threshold, the system deems sample to be malicious.

In response to a determination that the sample is malicious at 1020, process 1000 proceeds to 1025 at which an indication that the sample is malicious is provided. For example, the indication that the sample is malicious may be provided to the component from which the sample is received. As an example, the system provides the indication that the sample is malicious to a security entity. As another example, the system provides the indication that the sample is malicious to a client device. In some embodiments, the indication that the sample is malicious is provided to a user such as a user of a client device and/or a network administrator.

According to various embodiments, in response to receiving the indication that the sample is malicious, an active measure may be performed. The active measure may be performed in accordance (e.g., based at least in part on) one or more security policies. As an example, the one or more security policies may be preset by a network administrator, a customer (e.g., an organization/company) to a service that provides detection of malicious files, etc. Examples of active measures that may be performed include: isolating the file (e.g., quarantining the file), deleting the file, prompting the user to alert the user that a malicious file was detected, providing a prompt to a user when the a device attempts to open or execute the file, blocking transmission of the file, updating a blacklist of malicious files (e.g., a mapping of a hash for the traffic sample, such as a hash of the normalized header information, to an indication that the traffic sample is malicious), etc.

In response to a determination that the sample is not malicious at 1020, process 1000 proceeds to 1030. In some embodiments, in response to determining that the sample is not malicious, a mapping of samples (or hashes/signatures of header information, such as hashes for HTTP request headers) to an indication that the sample is not malicious is updated. For example, a whitelist of benign samples is updated to include the sample, or hash, signature, or other unique identifier associated with the sample.

At 1030, a determination is made as to whether process 1000 is complete. In some embodiments, process 1000 is determined to be complete in response to a determination that no further samples are to be analyzed (e.g., no further predictions for traffic are needed), an administrator indicates that process 1000 is to be paused or stopped, etc. In response to a determination that process 1000 is complete, process 1000 ends. In response to a determination that process 1000 is not complete, process 1000 returns to 1105.

Figure 11:
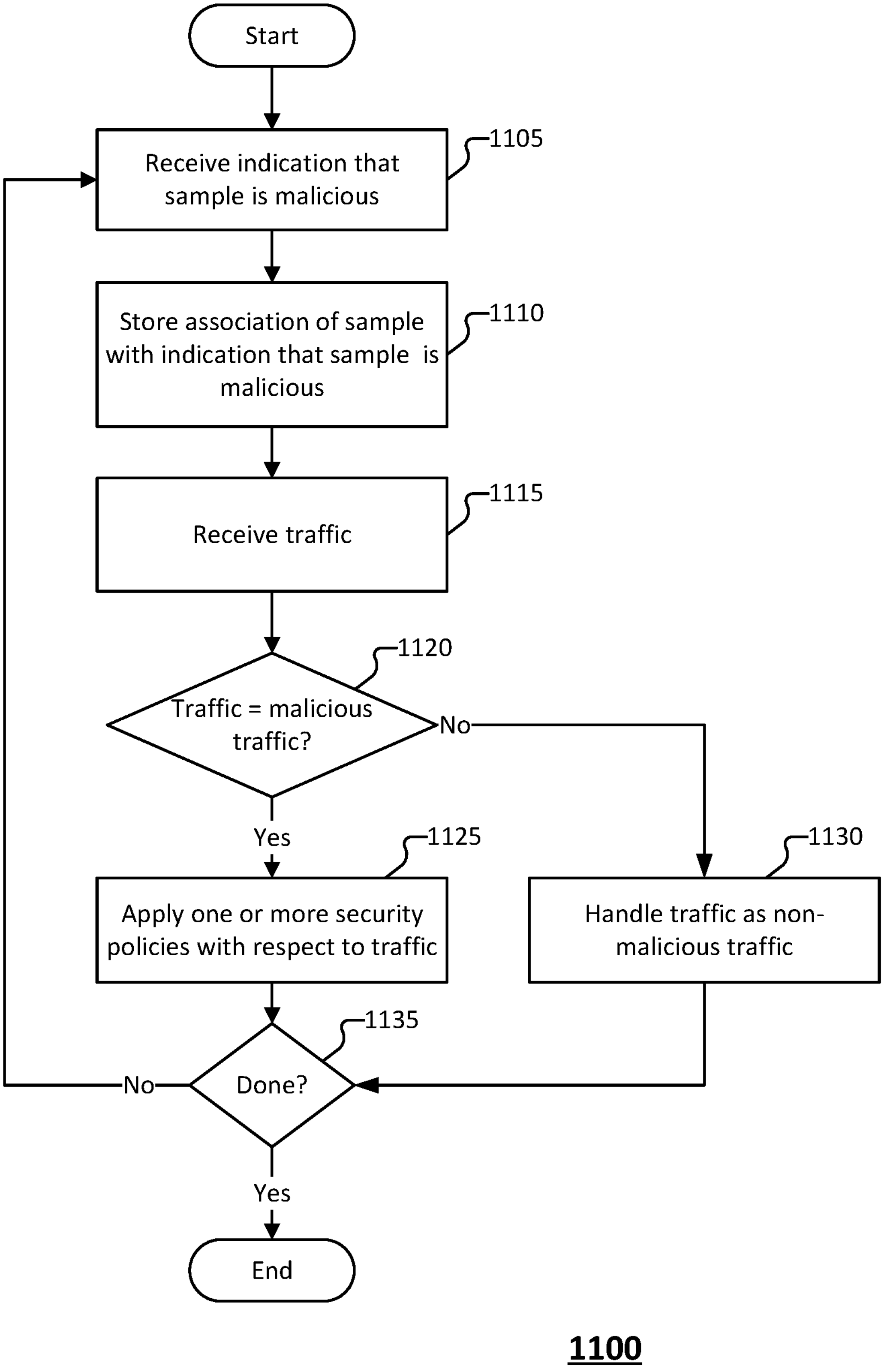
FIG. 11 is a flow diagram of a method for handling traffic according to various embodiments.

FIG. 11 is a flow diagram of a method for handling traffic according to various embodiments. In some embodiments, process 1100 is implemented at least in part on by system 100 of FIG. 1, system 200 of FIG. 2, and/or system 300 of FIG. 3A. In some implementations, process 1100 may be implemented by one or more servers, such as in connection with providing a service to a network (e.g., a security entity and/or a network endpoint such as a client device). In some implementations, process 1100 may be implemented by a security entity (e.g., a firewall) such as in connection with enforcing a security policy with respect to files communicated across a network or in/out of the network. In some implementations, process 1100 may be implemented by a client device such as a laptop, a smartphone, a personal computer, etc., such as in connection with executing or opening a file such as an email attachment, or sending HTTP requests across a network.

At 1105, an indication that the sample is malicious is received. In some embodiments, the system receives an indication that a sample is malicious, and the sample or hash, signature, or other unique identifier associated with the sample. For example, the system may receive the indication that the sample is malicious from a service such as a security or malware service. The system may receive the indication that the sample is malicious from one or more servers, such as a cloud service that provides near real-time traffic detection (e.g., a detection latency from the cloud service may be on the order of 10-50 ms).

According to various embodiments, the indication that the sample is malicious is received in connection with an update to a set of previously identified malicious samples (e.g., headers or normalized headers for HTTP requests). For example, the system receives the indication that the sample is malicious as an update to a blacklist of malicious samples.

At 1110, an association of the sample with an indication that the sample is malicious is stored. In response to receiving the indication that the sample is malicious, the system stores the indication that the sample is malicious in association with the sample or an identifier corresponding to the sample to facilitate a lookup (e.g., a local lookup) of whether subsequently received traffic is malicious. In some embodiments, the identifier corresponding to the sample stored in association with the indication that the sample is malicious comprises a hash of the header (or part of the header or normalized header), a signature of the header (or part of the header or normalized header), an IP address associated with the device from which the HTTP request originated, or another unique identifier associated with the header or normalized header.

At 1115, traffic is received. The system may obtain traffic such as in connection with routing traffic within/across a network, or mediating traffic into/out of a network such as a firewall, or a monitoring of email traffic or instant message traffic.

At 1120, a determination of whether the traffic includes a malicious traffic is performed. For example, the system detects whether the traffic is C2 traffic. In some embodiments, the system obtains the traffic sample (e.g., an HTTP request or header for the HTTP request) from the received traffic. In response to obtaining the traffic sample from the traffic, the system determines whether the traffic sample corresponds to a sample comprised in a set of previously identified malicious samples such as a blacklist of malicious samples (e.g., a blacklist of headers for HTTP requests, etc.). In response to determining that the traffic sample is comprised in the set of samples on the blacklist of malicious samples, the system determines that the sample is malicious.

In some embodiments, the system determines whether the traffic sample corresponds to a sample comprised in a set of previously identified benign samples such as a whitelist of benign samples. In response to determining that the sample is comprised in the set of samples on the whitelist of benign samples, the system determines that the sample is not malicious.

According to various embodiments, in response to determining the traffic sample is not comprised in a set of previously identified malicious samples, the system determines to classify the sample based on a different analysis. For example, the system queries a classifier (e.g., machine learning model) as described according to various embodiments to determine whether the sample is malicious (e.g., that the sample corresponds to C2 traffic).

According to various embodiments, in response to determining the traffic sample is not comprised in a set of previously identified malicious samples (e.g., a blacklist of malicious samples) or a set of previously identified benign samples (e.g., a whitelist of benign files), the system deems the traffic sample as being non-malicious (e.g., benign).

According to various embodiments, in response to determining the traffic sample is not comprised in a set of previously identified malicious samples (e.g., a blacklist of malicious samples) or a set of previously identified benign samples (e.g., a whitelist of benign samples), the system queries a malicious traffic detector to determine whether the traffic is malicious (e.g., to perform automatic C2 traffic detection). For example, the system may quarantine the traffic until the system receives response from the malicious traffic detector as to whether the traffic sample is malicious. The malicious traffic detector may perform an assessment of whether the traffic sample is malicious contemporaneous with the handling of the traffic by the system (e.g., in real-time with the query from the system). The malicious traffic detector may correspond to network traffic classifier 170 of system 100 of FIG. 1 and/or system 200 of FIG. 2.

In some embodiments, the system determines whether the traffic sample is comprised in the set of previously identified malicious samples or the set of previously identified benign samples by computing a hash or determining a signature or other unique identifier associated with the sample (e.g., an IP address for the device from which the HTTP request originated), and performing a lookup in the set of previously identified malicious samples or the set of previously identified benign samples for a sample (e.g., an HTTP request) matching the hash, signature or other unique identifier. Various hashing techniques may be implemented.

In response to a determination that the traffic is not malicious traffic at 1120, process 1100 proceeds to 1130 at which the traffic is handled as non-malicious traffic/information.

In response to a determination that the traffic sample is malicious at 1120, process 1100 proceeds to 1125 at which the traffic is handled as malicious traffic/information. The system may handle the malicious traffic/information based at least in part on one or more policies such as one or more security policies.

According to various embodiments, the handling of the malicious traffic/information may include performing an active measure. The active measure may be performed in accordance (e.g., based at least in part on) one or more security policies. As an example, the one or more security policies may be preset by a network administrator, a customer (e.g., an organization/company) to a service that provides detection of malicious traffic, etc. Examples of active measures that may be performed include: isolating the traffic (e.g., quarantining the traffic), deleting the traffic, prompting the user to alert the user that a malicious traffic was detected, blocking transmission of the traffic, updating a blacklist of malicious samples (e.g., a mapping of a hash for the traffic sample to an indication that the traffic sample is malicious, etc.).

At 1135, a determination is made as to whether process 1100 is complete. In some embodiments, process 1100 is determined to be complete in response to a determination that no further samples are to be analyzed (e.g., no further predictions for traffic are needed), an administrator indicates that process 1100 is to be paused or stopped, etc. In response to a determination that process 1100 is complete, process 1100 ends. In response to a determination that process 1100 is not complete, process 1100 returns to 1105.

Figure 12:
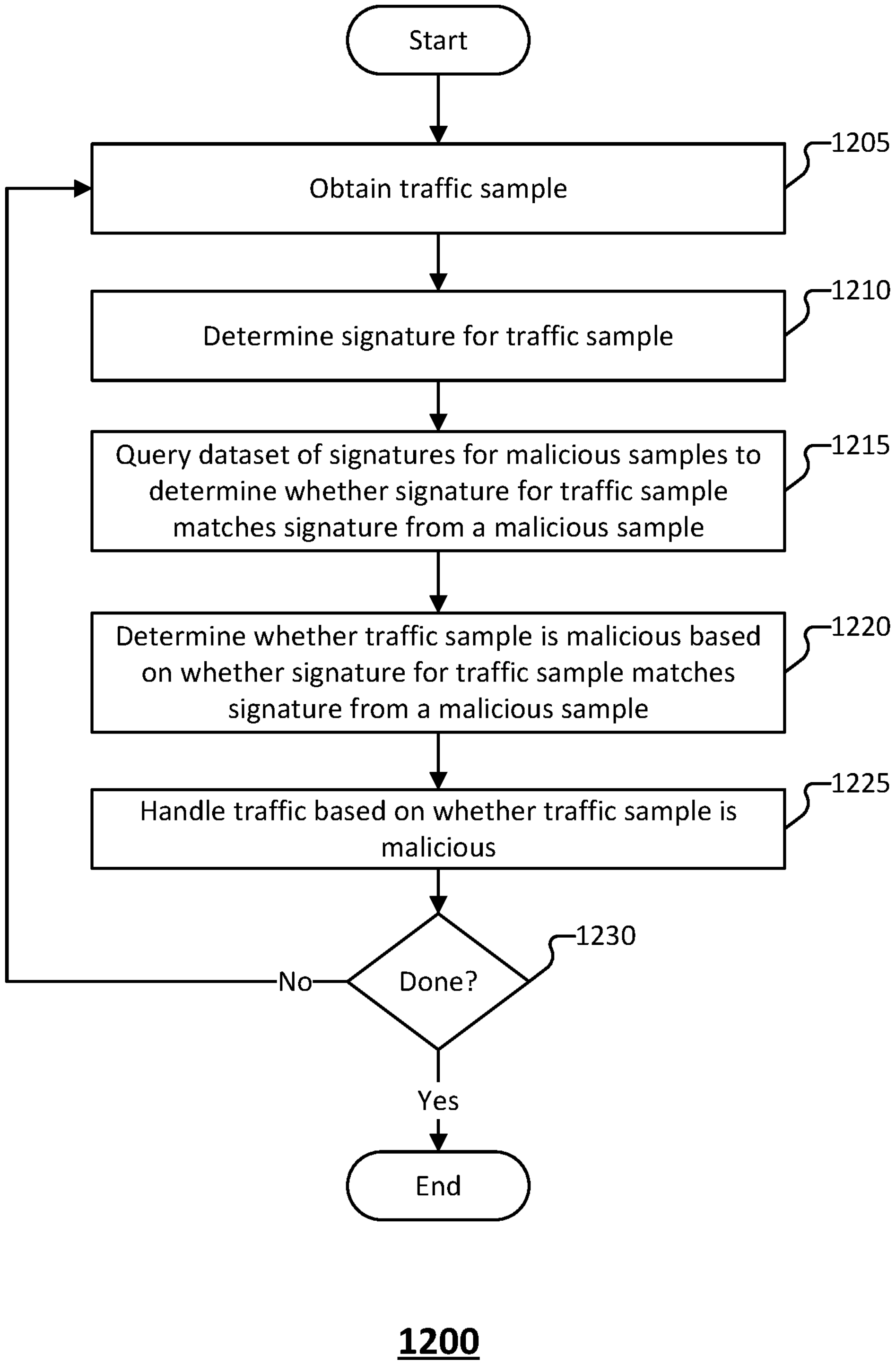
FIG. 12 is a flow diagram of a method for detecting malicious traffic according to various embodiments.

FIG. 12 is a flow diagram of a method for detecting malicious traffic according to various embodiments. In some embodiments, process 1200 is implemented at least in part by system 100 of FIG. 1, system 200 of FIG. 2, and/or system 300 of FIG. 3A. In some implementations, process 1200 may be implemented by a security entity (e.g., a firewall) such as in connection with enforcing a security policy with respect to traffic communicated across a network or in/out of the network, and/or an anti-malware application running on a client system, etc. In some implementations, process 1200 may be implemented by a client device such as a laptop, a smartphone, a personal computer, etc.

At 1205 a traffic sample is obtained from traffic. The system may obtain traffic such as in connection with routing traffic within/across a network, or mediating traffic into/out of a network such as a firewall, or a monitoring of email traffic or instant message traffic. In some embodiments, the system obtains the traffic sample from the received traffic.

At 1210, a signature corresponding to the traffic sample is determined. In some embodiments, the system computes a hash or determines a signature or other unique identifier associated with the traffic sample, such as based on the header information comprised in the traffic sample (e.g., a normalized header for an HTTP request). Various hashing techniques may be implemented. For example, the hashing technique may be the determining (e.g., computing) the MD5 hash for the header/header information comprised in the traffic sample (e.g., the HTTP request).

At 1215, a dataset for signatures of malicious samples is queried to determine whether the signature corresponding to the traffic sample matches a signature from a malicious sample. In some embodiments, the system performs a lookup in the dataset for signatures of malicious samples for a file matching the hash, signature or other unique identifier. The dataset for signatures of malicious samples may be stored locally at the system or remotely on a storage system that is accessible to the system.

At 1220, a determination of whether the traffic sample is malicious is made based at least in part on whether a signature for the traffic sample matches a signature for a malicious sample. In some embodiments, the system determines whether the dataset of malicious signature comprises a record matching the signature for the traffic sample obtained from traffic. In response to determining that the historical dataset indicates that a hash for the traffic sample is comprised in the dataset for signatures of malicious samples (e.g., the hash of the traffic sample is included in a blacklist of samples), the system deems the traffic sample obtained from the traffic at 1005 to be malicious. In some embodiments, in response to determining that the signature does not match a signature for a malicious sample (e.g., in a mapping of signatures to malicious samples/exploits), the system determines to classify the sample based on querying a classifier (e.g., a machine learning model that detects C2 traffic, etc.).

At 1225, the traffic is handled according to whether the traffic sample is malicious. In some embodiments, in response to determining that the traffic sample is malicious, the system applies one or more security policies with respect to the traffic. In some embodiments, in response to determining that the traffic sample is not malicious, the system handles the traffic as being benign (e.g., the traffic is handled as normal traffic).

At 1230, a determination is made as to whether process 1200 is complete. In some embodiments, process 1200 is determined to be complete in response to a determination that no further samples or traffic are to be analyzed (e.g., no further predictions for traffic are needed), an administrator indicates that process 1200 is to be paused or stopped, etc. In response to a determination that process 1200 is complete, process 1200 ends. In response to a determination that process 1200 is not complete, process 1200 returns to 1205.

Figure 13:
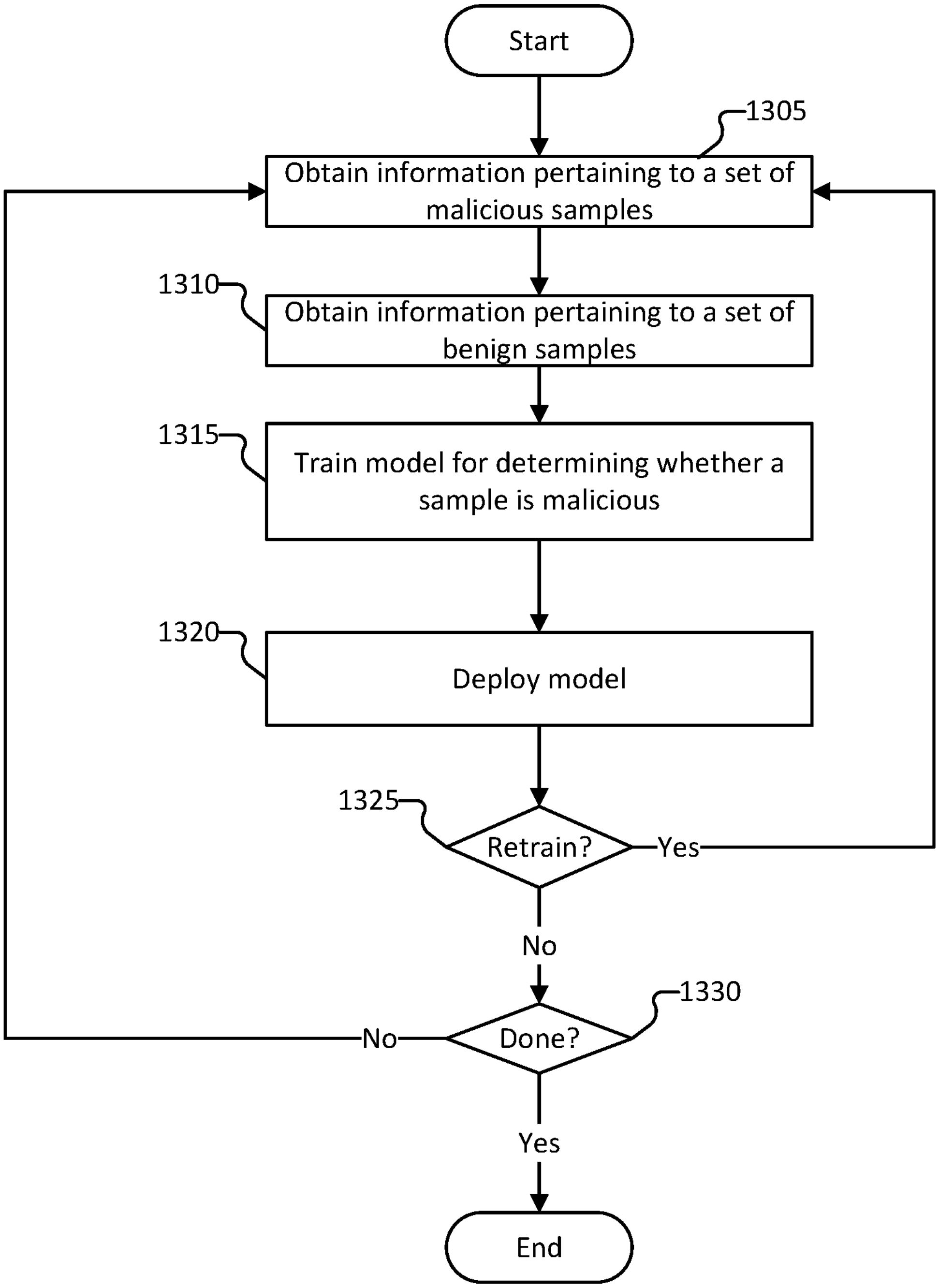
FIG. 13 is a flow diagram of a method for training a model according to various embodiments.

FIG. 13 is a flow diagram of a method for training a model according to various embodiments. In some embodiments, process 1300 is implemented at least in part by system 100 of FIG. 1, system 200 of FIG. 2, and/or system 300 of FIG. 3A.

At 1305, information pertaining to a set of historical malicious samples is obtained. In some embodiments, the system obtains the information pertaining to a set of historical malicious samples from a third-party service (e.g., VirusTotal™). The system may collect sample network traffic, including malicious traffic such as C2 traffic. The sample network traffic may include traffic obtained while monitoring traffic across an organization's network and/or traffic that is probabilistically generated (e.g., using random seeds obtained from an LLM, etc.). As an example, the system collects multiple types of C2 traffic, including Cobalt Strike, Empire, Covenant, etc. At 1310, information pertaining to a set of historical benign samples is obtained. In some embodiments, the system obtains the information pertaining to a set of historical benign samples from a third-party service (e.g., VirusTotal™). The system collects benign traffic, such as based on samples for which malicious traffic detection was previously performed (e.g., using one or more machine learning models, etc.). At 1315, a model is trained for determining whether a sample is malicious (e.g., whether a traffic sample is C2 traffic). Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. At 1320, the model is deployed. In some embodiments, the deploying of the model includes storing the model in a dataset of models for use in connection with analyzing traffic to determine whether the traffic is malicious. The deploying the model can include providing the model (or a location at which the model can be invoked) to a malicious traffic detector, such as network traffic classifier 170 of system 100 of FIG. 1, or to system 200 of FIG. 2. At 1330, a determination is made as to whether process 1300 is complete. In some embodiments, process 1300 is determined to be complete in response to a determination that no further models are to be determined/trained (e.g., no further classification models are to be created), no further models are to be retrained, no further sample C2 traffic is to be generated, an administrator indicates that process 1300 is to be paused or stopped, etc. In response to a determination that process 1300 is complete, process 1300 ends. In response to a determination that process 1300 is not complete, process 1300 returns to 1305.

Figure 14:
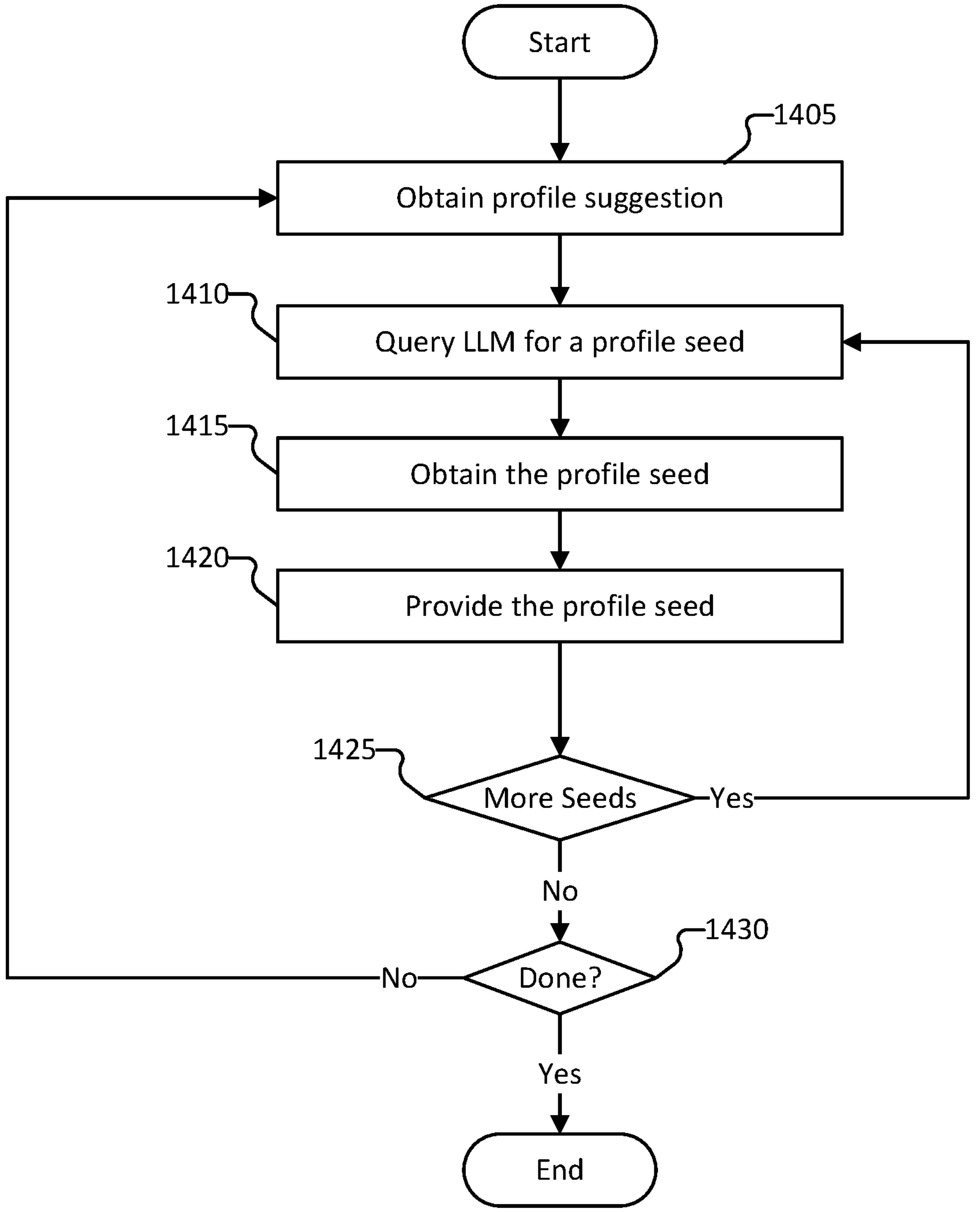
FIG. 14 is a flow diagram of a method for obtaining a sample profile seed(s) according to various embodiments.

FIG. 14 is a flow diagram of a method for obtaining a sample profile seed(s) according to various embodiments. In some embodiments, process 1400 is implemented at least in part by system 100 of FIG. 1, system 200 of FIG. 2, and/or system 300 of FIG. 3A. In some embodiments, process 1500 is implemented a profile orchestrator module, such as profile orchestrator 305 of system 300.

At 1405, the system obtains a profile suggestion. In some embodiments, the system obtains the profile suggestion from a fuzzer module, such as C2 fuzzer 310. The fuzzer module may be a set of code to be executed, another system, or a service running on one or more servers, etc. In connection with orchestrating the generation of C2 traffic samples (e.g., to be used to train or update a classifier such as a ML model), a profile orchestrator may request a profile suggestion such as from the fuzzer module. The system may obtain the profile orchestrator from the fuzzer module (e.g., by extracting the profile suggestion of a C2 traffic sample generated by the fuzzer).

At 1410, the system queries a large language model (LLM) for a profile seed. The system may query the LLM based at least in part on the profile suggestion. For example, the system provides the profile suggestion to the LLM and requests a set of one or more profile seeds. In some embodiments, the LLM corresponds to ChatGPT, Bard, etc.

At 1415, the system obtains the profile seed. In some embodiments, the system obtains a set of profile seeds, which the system may use in connection with causing a set of C2 traffic samples to be generated such as by a fuzzer module or other such system or service, etc.

At 1420, the system provides the profile seed. In some embodiments, in response to obtaining a profile seed from the LLM, the system provides the profile seed to the fuzzer module/system/service.

At 1425, the system determines whether additional profile seeds are to be generated or otherwise obtained from the LLM. In response to determining that another profile seed is to be obtained, process 1400 returns to 1410 and process 1400 iterates over 1410-1425 until no further profile seeds are to be generated. Conversely, in response to determining that no further profile seeds are to be obtained, process 1400 proceeds to 1430.

At 1430, a determination is made as to whether process 1400 is complete. In some embodiments, process 1400 is determined to be complete in response to a determination that no further models are to be determined/trained (e.g., no further classification models are to be created), no further models are to be retrained, no further seeds are to be obtained, no further sample C2 traffic is to be generated, an administrator indicates that process 1400 is to be paused or stopped, etc. In response to a determination that process 1400 is complete, process 1400 ends. In response to a determination that process 1400 is not complete, process 1400 returns to 1405.

Figure 15:
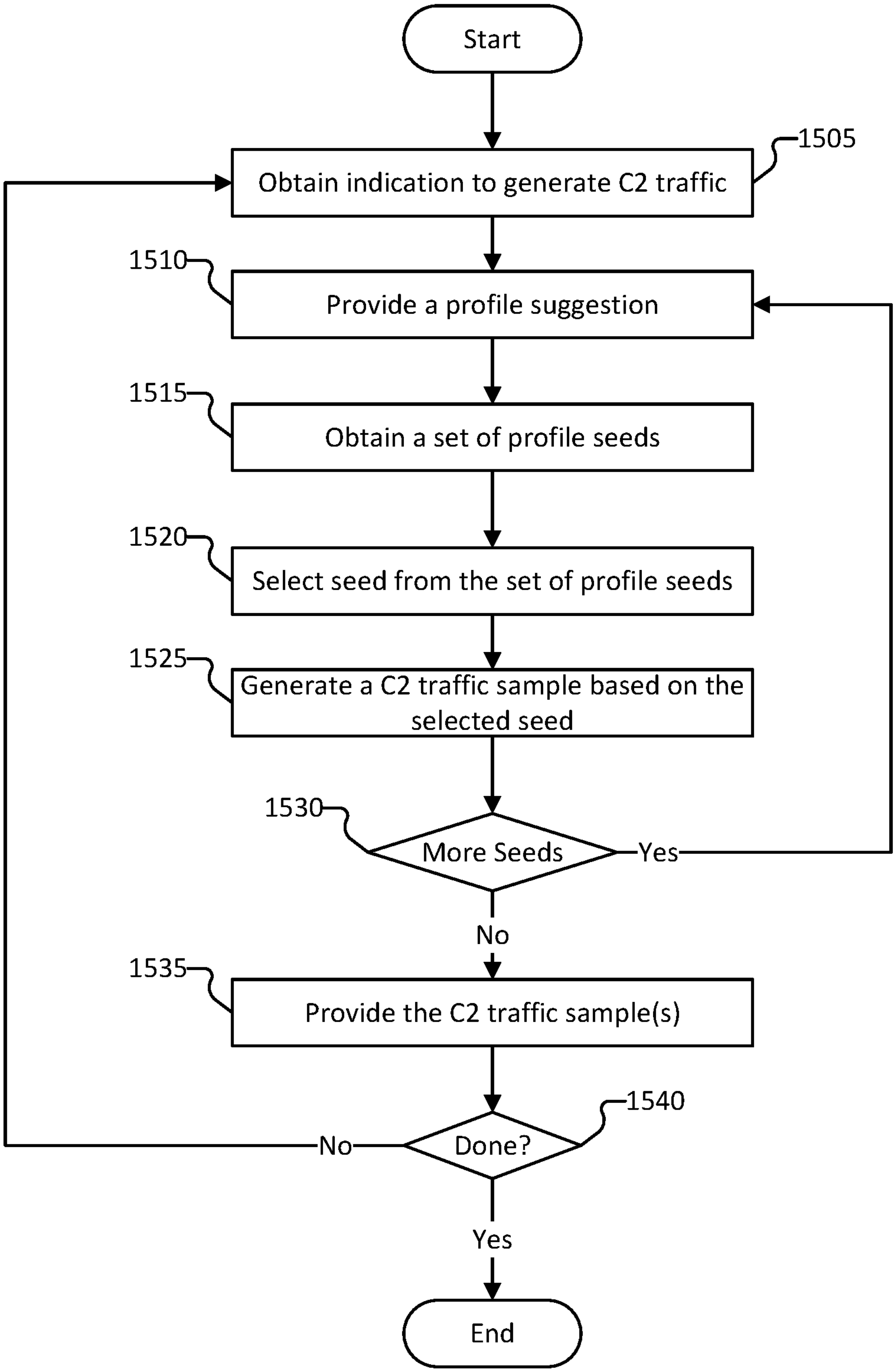
FIG. 15 is a flow diagram of a generating C2 traffic according to various embodiments.

FIG. 15 is a flow diagram of a generating C2 traffic according to various embodiments. In some embodiments, process 1500 is implemented at least in part by system 100 of FIG. 1, system 200 of FIG. 2, and/or system 300 of FIG. 3A. In some embodiments, process 1500 is implemented a fuzzer module, such as C2 fuzzer 310 of system 300.

At 1505, the system obtains an indication that C2 traffic is to be generated. At 1510, the system provides a profile suggestion. At 1515, the system obtains a set of profile seeds. The system can obtain the set of profile seeds by querying an LLM based at least in part on the profile suggestion. At 1520, the system selects a seed from the set of profile seeds. At 1525, the system generates a C2 traffic sample based on the selected seed. At 1530, the system determines whether a C2 traffic sample(s) is to be generated for another profile seed. In response to determining that additional C2 traffic sample(s) is to be generated, process 1500 returns to 1510 and process 1500 iterates over 1510-1530 until no further C2 traffic samples are to be generated. Conversely, in response to determining that no further C2 traffic samples are to be generated, process 1500 proceeds to 1535. At 1535, the system provides the C2 traffic sample(s). For example, the system provides the C2 traffic sample(s) to another system, module, or other mechanism that is to train/re-train a classifier (e.g., a ML model). For example, a training set for training/re-training the classifier comprises the generated C2 traffic sample(s). The C2 traffic sample(s) correspond to malicious traffic samples for the training set. At 1540, a determination is made as to whether process 1500 is complete. In some embodiments, process 1500 is determined to be complete in response to a determination that no further models are to be determined/trained (e.g., no further classification models are to be created), no further models are to be retrained, no further seeds are to be obtained, no further sample C2 traffic is to be generated, an administrator indicates that process 1500 is to be paused or stopped, etc. In response to a determination that process 1500 is complete, process 1500 ends. In response to a determination that process 1500 is not complete, process 1500 returns to 1505.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for detecting C2 traffic, comprising:

one or more processors configured to:

generate a fuzzing based on a C2 machine learning (ML) detection model using a large language model (LLM) for performing profile-based seed generation, wherein the LLM is queried with (i) a profile suggestion obtained from a C2 framework fuzzing tool, and (ii) classification feedback from prior predictions of the C2 ML detection model to produce C2 configuration profiles that are generated based on a profile syntax and a format definition and used as seeds for the fuzzing tool;

determine a code coverage for a set of existing profile seeds, wherein determining the code coverage includes monitoring a number of lines of code executed by a C2 configuration profile corresponding to a particular seed of the set of existing profile seeds;

in response to determining, based at least in part on the code coverage, to generate a set of new seeds, cause the LLM to generate the set of new seeds to be used to retrain the C2 ML detection model; and detect C2 traffic using the C2 ML detection model, wherein detecting the C2 traffic comprises:

obtaining a traffic sample;

generating a tuple representation of header information in the traffic sample, the tuple comprising a header type identifier, an encoder type, and a length field; and determining header embeddings from the tuple and providing the header embeddings to a neural network to obtain a predicted traffic classification; and a memory coupled to the one or more processors and configured to provide the one or more processors with instructions.

2. The system of claim 1, wherein generating the fuzzing based on the C2 ML detection model comprises:

causing a C2 framework fuzzing tool to generate a set of C2 configuration profiles.

3. The system of claim 2, wherein the C2 framework fuzzing tool generates a C2 configuration profile based at least in part on obtaining a seed value and determining the C2 configuration profiles based at least in part on the seed value.

4. The system of claim 3, wherein the seed value is generated by a probabilistic module.

5. The system of claim 3, wherein the seed value is obtained based at least in part on querying a large language model (LLM) for the seed value.

6. The system of claim 5, wherein the LLM comprises ChatGPT, vertex AI, or LLaMA.

7. The system of claim 5, wherein the LLM is queried based on a profile suggestion obtained from C2 framework fuzzing tool.

8. The system of claim 1, wherein detecting C2 traffic using C2 ML detection model comprises detecting Powershell Empire C2 traffic.

9. The system of claim 1, wherein detecting C2 traffic using C2 ML detection model comprises detecting Cobalt Strike C2 traffic.

10. The system of claim 1, wherein the one or more processors are further configured to update the C2 ML detection model.

11. The system of claim 10, wherein the C2 ML detection model is updated based on collected feedback from predicted traffic classifications.

12. The system of claim 10, wherein the C2 ML detection model is updated based at least in part on adversarial training.

13. The system of claim 12, wherein the adversarial training includes periodically generating C2 configuration profiles.

14. The system of claim 10, wherein updating the C2 ML detection model comprises:

determining a code coverage for a set of existing profile seeds; and determining, based at least in part on the code coverage, to generate a set of new seeds to be used to retrain the C2 ML detection model.

15. The system of claim 14, wherein determining the code coverage for a set of existing profile seeds includes monitoring a number of lines of code executed by a C2 configuration profile corresponding to a particular seed of the set of existing profile seeds.

16. The system of claim 1, wherein the one or more processors are further configured to:

obtaining a traffic sample;

querying the C2 ML detection model to obtain a predicted traffic classification for the traffic sample;

determining that the traffic sample is C2 traffic based at least in part on the predicted traffic classification; and in response to determining that the traffic sample is C2 traffic, handle network traffic corresponding to the traffic sample according to a security policy.

17. The system of claim 16, wherein handling the network traffic according to the security policy comprises performing an active measure.

18. The system of claim 1, wherein querying the large language model (LLM) comprises providing (i) a canonical C2 parameter vector including jitter, sleep interval, stager encoding, user-agent, and domain fronting parameters, and (ii) classification error statistics from prior model predictions, the LLM returning one or more C2 configuration profiles validated against a C2 framework schema.

19. The system of claim 1, wherein the one or more processors are further configured to map a standard set of C2 configuration parameters into configuration files for a plurality of C2 frameworks, execute the configurations across the frameworks, and generate paired traffic samples used to train a framework-agnostic classifier.

20. The system of claim 1, wherein querying the large language model (LLM) comprises providing (i) a canonical C2 parameter vector including jitter, sleep interval, stager encoding, user-agent, and domain fronting parameters, and (ii) classification feedback from prior predictions of the C2 ML detection model, the LLM returning one or more C2 configuration profiles that are generated based on a profile syntax and a format definition.

21. The system of claim 1, wherein the one or more processors are further configured to periodically generate C2 configuration profiles using the LLM and use the periodically generated profiles in adversarial training of the C2 ML detection model.

22. A method for detecting C2 traffic, comprising:

generating, by one or more processors, a fuzzing based on a C2 machine learning (ML) detection model using a large language model (LLM) for performing profile-based seed generation, wherein the LLM is queried with (i) a profile suggestion obtained from a C2 framework fuzzing tool, and (ii) classification feedback from prior predictions of the C2 ML detection model to produce C2 configuration profiles that are generated based on a profile syntax and a format definition and used as seeds for the fuzzing tool;

determining a code coverage for a set of existing profile seeds, wherein determining the code coverage includes monitoring a number of lines of code executed by a C2 configuration profile corresponding to a particular seed of the set of existing profile seeds;

in response to determining, based at least in part on the code coverage, to generate a set of new seeds, cause the LLM to generate the set of new seeds to be used to retrain the C2 ML detection model; and detecting C2 traffic using the C2 ML detection model, wherein detecting the C2 traffic comprises:

obtaining a traffic sample;

generating a tuple representation of header information in the traffic sample, the tuple comprising a header type identifier, an encoder type, and a length field; and determining header embeddings from the tuple and providing the header embeddings to a neural network to obtain a predicted traffic classification.

23. A computer program product embodied in a non-transitory computer readable medium for visualizing data, and the computer program product comprising computer instructions for:

generating, by one or more processors, a fuzzing based on a C2 machine learning detection model using a large learning model (LLM) for performing profile-based seed generation, wherein the LLM is queried with (i) a profile suggestion obtained from a C2 framework fuzzing tool, and (ii) classification feedback from prior predictions of the C2 ML detection model to produce C2 configuration profiles that are generated based on a profile syntax and a format definition and used as seeds for the fuzzing tool;

determining a code coverage for a set of existing profile seeds, wherein determining the code coverage includes monitoring a number of lines of code executed by a C2 configuration profile corresponding to a particular seed of the set of existing profile seeds;

in response to determining, based at least in part on the code coverage, to generate a set of new seeds, cause the LLM to generate the set of new seeds to be used to retrain the C2 ML detection model; and detecting C2 traffic using the C2 ML detection model, wherein detecting the C2 traffic comprises:

obtaining a traffic sample;

generating a tuple representation of header information in the traffic sample, the tuple comprising a header type identifier, an encoder type, and a length field; and determining header embeddings from the tuple and providing the header embeddings to a neural network to obtain a predicted traffic classification.

24. A system for training a C2 machine-learning detection model, comprising:

one or more processors configured to:

generate a fuzzing based on a C2 machine learning (ML) detection model using a large learning model (LLM) for performing profile-based seed generation, wherein the LLM is queried with (i) a profile suggestion obtained from a C2 framework fuzzing tool, and (ii) classification feedback from prior predictions of the C2 ML detection model to produce C2 configuration profiles that are generated based on a profile syntax and a format definition and used as seeds for the fuzzing tool;

determine a code coverage for a set of existing profile seeds, wherein determining the code coverage includes monitoring a number of lines of code executed by a C2 configuration profile corresponding to a particular seed of the set of existing profile seeds;

in response to determining, based at least in part on the code coverage, to generate a set of new seeds, cause the LLM to generate the set of new seeds to be used to retrain the C2 ML detection model; and update the C2 ML detection model using a feedback mechanism, wherein updating the C2 ML detection model comprises:

obtaining a traffic sample;

generating a tuple representation of header information in the traffic sample, the tuple comprising a header type identifier, an encoder type, and a length field; and determining header embeddings from the tuple and providing the header embeddings to a neural network to obtain a predicted traffic classification; and a memory coupled to the one or more processors and configured to provide the one or more processors with instructions.

* * * * *